United States Patent
Zhang et al.

(10) Patent No.: US 10,932,093 B2
(45) Date of Patent: *Feb. 23, 2021

(54) DEVICE POSITION OBTAINING METHOD, AND DEVICE

(71) Applicant: Huawei Technologies Co., Ltd., Shenzhen (CN)

(72) Inventors: Yajun Zhang, Shenzhen (CN); Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,840

(22) Filed: Dec. 16, 2019

(65) Prior Publication Data

US 2020/0162848 A1  May 21, 2020

Related U.S. Application Data

(63) Continuation of application No. 15/554,631, filed as application No. PCT/CN2015/073537 on Mar. 3, 2015, now Pat. No. 10,511,937.

(51) Int. Cl.
| | |
|---|---|
| H04W 24/00 | (2009.01) |
| H04W 4/029 | (2018.01) |
| G08B 21/24 | (2006.01) |
| H04B 5/02 | (2006.01) |
| G08B 21/02 | (2006.01) |

(Continued)

(52) U.S. Cl.
CPC ........ *H04W 4/029* (2018.02); *G08B 21/0272* (2013.01); *G08B 21/0277* (2013.01); *G08B 21/24* (2013.01); *H04B 1/713* (2013.01); *H04B 5/02* (2013.01); *H04W 4/80* (2018.02)

(58) Field of Classification Search
None
See application file for complete search history.

(56) References Cited

U.S. PATENT DOCUMENTS 10,511,937 B2 * 12/2019 Zhang .................... G08B 21/24
2008/0004041 A1    1/2008 Ahn et al.
(Continued)

FOREIGN PATENT DOCUMENTS

| CN | 103745578 A | 4/2014 |
|---|---|---|
| CN | 103841514 A | 6/2014 |

(Continued)

OTHER PUBLICATIONS

Machine Translation and Abstract of Chinese Publication No. CN103745578, Apr. 23, 2014, 14 pages.
(Continued)

*Primary Examiner* — Erika A Washington
(74) *Attorney, Agent, or Firm* — Conley Rose, P.C.

(57) ABSTRACT

A method includes obtaining, by a first device, BLUETOOTH connection information of a second device, obtaining, by the first device according to the BLUETOOTH connection information, a BLUETOOTH signal from the second device, determining, by the first device according to the obtained BLUETOOTH signal from the second device, position information of the second device, and sending, by the first device, the position information to a third device.

20 Claims, 12 Drawing Sheets

(51) Int. Cl.
*H04W 4/80* (2018.01)
*H04B 1/713* (2011.01)

(56) References Cited

U.S. PATENT DOCUMENTS

| | | | | |
|---|---|---|---|---|
| 2011/0084807 | A1* | 4/2011 | Logan | H04W 4/029 |
| | | | | 340/10.1 |
| 2011/0140883 | A1* | 6/2011 | Yamashita | H04N 5/23203 |
| | | | | 340/539.13 |
| 2012/0280859 | A1 | 11/2012 | Moshfeghi | |
| 2013/0231131 | A1 | 9/2013 | Di Cera Colazingari | |
| 2013/0281110 | A1 | 10/2013 | Zelinka | |
| 2014/0049361 | A1 | 2/2014 | Ahearn et al. | |
| 2014/0111307 | A1 | 4/2014 | Ingrassia, Jr. et al. | |
| 2015/0065052 | A1 | 3/2015 | Heo et al. | |
| 2015/0312845 | A1* | 10/2015 | Teeni | G06F 21/629 |
| | | | | 455/411 |
| 2015/0365787 | A1* | 12/2015 | Farrell | H04W 4/029 |
| | | | | 455/456.1 |
| 2017/0142681 | A1 | 5/2017 | Chen | |
| 2017/0208564 | A1* | 7/2017 | Lee | H04W 4/80 |

FOREIGN PATENT DOCUMENTS

| | | |
|---|---|---|
| CN | 104066055 A | 9/2014 |
| CN | 104219621 A | 12/2014 |
| EP | 2608097 A1 | 6/2013 |

OTHER PUBLICATIONS

Machine Translation and Abstract of Chinese Publication No. CN103841514, Jun. 4, 2014, 13 pages.
Machine Translation and Abstract of Chinese Publication No. CN104066055, Sep. 24, 2014, 13 pages.
"Indoor Positioning Services," Bluetooth Service Specification, V1.0.0, May 19, 2015, 22 pages.
Foreign Communication From A Counterpart Application, PCT Application No. PCT/CN2015/073537, English Translation of International Search Report dated Dec. 8, 2015, 2 pages.
Foreign Communication From A Counterpart Application, PCT Application No. PCT/CN2015/073537, English Translation of Written Opinion dated Dec. 7, 2015, 6 pages.
Foreign Communication From A Counterpart Application, Chinese Application No. 201580018317.0, Chinese Office Action dated Nov. 6, 2019, 4 pages.

* cited by examiner

DEVICE POSITION OBTAINING METHOD, AND DEVICE

CROSS-REFERENCE TO RELATED APPLICATIONS

This application is a continuation of U.S. patent application Ser. No. 15/554,631 filed on Aug. 30, 2017, now U.S. Pat. No. 10,511,937, which is a U.S. National Stage of International Patent Application No. PCT/CN2015/073537 filed on Mar. 3, 2015. All of the aforementioned applications are hereby incorporated by reference in their entireties.

TECHNICAL FIELD

The present disclosure relates to the field of communications technologies, and in particular, to a device position obtaining method and a device.

BACKGROUND

With development of a short-distance communications technology, there are more anti-lost devices that are based on the short-distance communications technology, such as a property tracking label, a child anti-lost hand ring, and a watch. Such anti-lost devices provide a user with an anti-lost application that is within a line-of-sight range. Further, a short-distance communication connection is established between an anti-lost device and a mobile phone. When a distance between the anti-lost device and the mobile phone exceeds a specific threshold, a radio signal of the short-distance communication connection established between the anti-lost device and the mobile phone is weaker, and the mobile phone or the anti-lost device sends an alert to inform the user that the anti-lost device is relatively far away from the user.

However, once the anti-lost device is beyond the line-of-sight range, the user cannot directly find a position of the anti-lost device. The user can only try to search along a possible direction of the anti-lost device. The anti-lost device can indicate, according to a signal strength of the short-distance radio signal, whether the user is far away from or close to the anti-lost device. Therefore, in other approaches, the position of the anti-lost device relative to the user cannot be clearly indicated.

SUMMARY

Embodiments of the present disclosure provide a device position obtaining method and a device in order to provide a user with a method for searching for a second device intuitively and quickly.

According to a first aspect, a device position obtaining method is provided, including obtaining, by a first device, BLUETOOTH connection information of a second device, obtaining, by the first device according to the BLUETOOTH connection information, a BLUETOOTH signal sent by the second device, determining, by the first device, position information of the second device according to the obtained BLUETOOTH signal sent by the second device, and sending, by the first device, the position information to the third device.

With reference to the first aspect, in a first implementation manner of the first aspect, obtaining, by a first device, BLUETOOTH connection information of a second device includes performing, by the first device, device discovery with the third device, where the BLUETOOTH connection information of the second device is stored in the third device, and obtaining, by the first device, the BLUETOOTH connection information from the third device.

With reference to the first aspect, in a second implementation manner of the first aspect, the BLUETOOTH connection information of the second device includes a BLUETOOTH address of the second device, and obtaining, by the first device according to the BLUETOOTH connection information, a BLUETOOTH signal sent by the second device includes adding, by the first device, the BLUETOOTH address of the second device to a listening table, and listening to, by the first device on a full BLUETOOTH band, the BLUETOOTH signal sent by a device in the listening table.

With reference to the first aspect, in a third implementation manner of the first aspect, the BLUETOOTH connection information of the second device includes a frequency hopping timeslot of the second device and a BLUETOOTH address of the second device, and obtaining, by the first device according to the BLUETOOTH connection information, a BLUETOOTH signal sent by the second device includes adding, by the first device, the BLUETOOTH address of the second device to a listening table, and listening to, by the first device in the frequency hopping timeslot of the second device, the BLUETOOTH signal sent by a device in the listening table.

With reference to the first aspect, in a fourth implementation manner of the first aspect, the BLUETOOTH connection information of the second device includes a BLUETOOTH address of the second device, and obtaining, by the first device according to the BLUETOOTH connection information, a BLUETOOTH signal sent by the second device includes setting, by the first device, a whitelist that includes the BLUETOOTH address of the second device, entering, by the first device, a scanning mode, and establishing a BLUETOOTH connection to the second device when receiving a paging message that carries the BLUETOOTH address of the second device, and receiving, by the first device, the BLUETOOTH signal sent by the second device.

With reference to the first aspect, in a fifth implementation manner of the first aspect, the BLUETOOTH connection information of the second device includes a BLUETOOTH address of the second device, and obtaining, by the first device according to the BLUETOOTH connection information, a BLUETOOTH signal sent by the second device includes switching the first device to a connectable directed broadcast mode, sending a connectable directed broadcast message, where the connectable directed broadcast message carries the BLUETOOTH address of the second device, establishing, by the first device, a BLUETOOTH connection to the second device, and receiving, by the first device, the BLUETOOTH signal sent by the second device.

With reference to the first aspect, in a sixth implementation manner of the first aspect, the BLUETOOTH connection information of the second device includes a frequency hopping timeslot of the second device, and obtaining, by the first device according to the BLUETOOTH connection information, a BLUETOOTH signal sent by the second device includes sending, by the first device in the frequency hopping timeslot of the second device, a paging message, receiving, by the first device, a paging response message of the paging message, where a time interval between the paging response message and the paging message is less than a preset time, establishing, by the first device, a BLUETOOTH connection to the second device, and receiving, by the first device, the BLUETOOTH signal sent by the second device.

According to a second aspect, a device position obtaining method is provided, including obtaining, by a third device, BLUETOOTH connection information of a second device, sending, by the third device, the BLUETOOTH connection information of the second device to a first device, receiving, by the third device, position information of the second device that is sent by the first device, where the position information of the second device is determined by the first device according to a BLUETOOTH signal that is sent by the second device and that is obtained by the first device according to the BLUETOOTH connection information of the second device, and reporting, by the third device, the position information of the second device.

With reference to the second aspect, in a first implementation manner of the second aspect, obtaining, by a third device, BLUETOOTH connection information of a second device includes performing, by the third device, device discovery with the second device, or establishing a BLUETOOTH connection to the second device, and receiving, by the third device, the BLUETOOTH connection information of the second device that is sent by the second device.

According to a third aspect, a first device is provided, including a first obtaining module configured to obtain BLUETOOTH connection information of a second device, a second obtaining module configured to obtain, according to the BLUETOOTH connection information, a BLUETOOTH signal sent by the second device, a determining module configured to determine position information of the second device according to the obtained BLUETOOTH signal sent by the second device, and a sending module configured to send the position information to a third device.

With reference to the third aspect, in a first implementation manner of the third aspect, the first obtaining module is further configured to perform device discovery with the third device, and obtain the BLUETOOTH connection information of the second device from the third device, where the BLUETOOTH connection information of the second device is stored in the third device.

With reference to the third aspect, in a second implementation manner of the third aspect, the BLUETOOTH connection information of the second device includes a BLUETOOTH address of the second device, and the second obtaining module is further configured to add the BLUETOOTH address of the second device to a listening table, and listen to, on a full BLUETOOTH band, the BLUETOOTH signal sent by a device in the listening table.

With reference to the third aspect, in a third implementation manner of the third aspect, the BLUETOOTH connection information of the second device includes a frequency hopping timeslot of the second device and a BLUETOOTH address of the second device, and the second obtaining module is further configured to add the BLUETOOTH address of the second device to a listening table, and listen to, in the frequency hopping timeslot of the second device, the BLUETOOTH signal sent by a device in the listening table.

With reference to the third aspect, in a fourth implementation manner of the third aspect, the BLUETOOTH connection information of the second device includes a BLUETOOTH address of the second device, and the second obtaining module is further configured to set a whitelist that includes the BLUETOOTH address of the second device, enter a scanning mode, and establish a BLUETOOTH connection to the second device when receiving a paging message that carries the BLUETOOTH address of the second device, and receive the BLUETOOTH signal sent by the second device.

With reference to the third aspect, in a fifth implementation manner of the third aspect, the BLUETOOTH connection information of the second device includes a BLUETOOTH address of the second device, and the second obtaining module is configured to switch the first device to a connectable directed broadcast mode such that the first device sends a connectable directed broadcast message, where the connectable directed broadcast message carries the BLUETOOTH address of the second device, and establishes a BLUETOOTH connection to the second device, and receive the BLUETOOTH signal sent by the second device.

With reference to the third aspect, in a sixth implementation manner of the third aspect, the BLUETOOTH connection information of the second device includes a frequency hopping timeslot of the second device, and the second obtaining module is configured to send a paging message in the frequency hopping timeslot of the second device, receive a paging response message of the paging message, where a time interval between the paging response message and the paging message is less than a preset time, establish a BLUETOOTH connection to the second device, and receive the BLUETOOTH signal sent by the second device.

According to a fourth aspect, a third device is provided, including an obtaining module configured to obtain BLUETOOTH connection information of a second device, a sending module configured to send the BLUETOOTH connection information of the second device to a first device, a receiving module configured to receive position information of the second device that is sent by the first device, where the position information of the second device is determined by the first device according to a BLUETOOTH signal that is sent by the second device and that is obtained by the first device according to the BLUETOOTH connection information of the second device, and a prompt module configured to report the position information of the second device.

With reference to the fourth aspect, in a first implementation manner of the fourth aspect, the obtaining module is further configured to perform device discovery with the second device, or establish a BLUETOOTH connection to the second device, and receive the BLUETOOTH connection information of a second device that is sent by the second device.

According to a fifth aspect, a first device is provided, including a memory, one or more processors, and one or more programs, where the one or more programs are stored in the memory and configured to be executed by the one or more processors, the one or more programs include an instruction, and the instruction is used to obtain BLUETOOTH connection information of a second device, obtain, according to the BLUETOOTH connection information, a BLUETOOTH signal sent by the second device, determine, position information of the second device according to the obtained BLUETOOTH signal sent by the second device, and send the position information to the third device.

With reference to the fifth aspect, in a first implementation manner of the fifth aspect, obtaining BLUETOOTH connection information of a second device includes performing device discovery with the third device, and obtaining the BLUETOOTH connection information of the second device from the third device, where the BLUETOOTH connection information of the second device is stored in the third device.

With reference to the fifth aspect, in a second implementation manner of the fifth aspect, the BLUETOOTH connection information of the second device includes a BLUETOOTH address of the second device, and obtaining, according to the BLUETOOTH connection information, a BLUETOOTH signal sent by the second device includes adding the BLUETOOTH address of the second device to a listening table, and listening to, on a full BLUETOOTH band, the BLUETOOTH signal sent by a device in the listening table.

With reference to the fifth aspect, in a third implementation manner of the fifth aspect, the BLUETOOTH connection information of the second device includes a frequency hopping timeslot of the second device and a BLUETOOTH address of the second device, and obtaining, according to the BLUETOOTH connection information, a BLUETOOTH signal sent by the second device includes adding the BLUETOOTH address of the second device to a listening table, and listening to, in a frequency hopping timeslot of the second device, the BLUETOOTH signal sent by a device in the listening table.

With reference to the fifth aspect, in a fourth implementation manner of the fifth aspect, the BLUETOOTH connection information of the second device includes a BLUETOOTH address of the second device, and obtaining, according to the BLUETOOTH connection information, a BLUETOOTH signal sent by the second device includes setting a whitelist that includes the BLUETOOTH address of the second device, entering a scanning mode, establishing a BLUETOOTH connection to the second device when receiving a paging message that carries the BLUETOOTH address of the second device, and receiving the BLUETOOTH signal sent by the second device.

With reference to the fifth aspect, in a fifth implementation manner of the fifth aspect, the BLUETOOTH connection information of the second device includes a BLUETOOTH address of the second device, and obtaining, according to the BLUETOOTH connection information, a BLUETOOTH signal sent by the second device includes switching to a connectable directed broadcast mode, sending a connectable directed broadcast message, where the connectable directed broadcast message carries the BLUETOOTH address of the second device, establishing a BLUETOOTH connection to the second device, and receiving the BLUETOOTH signal sent by the second device.

With reference to the fifth aspect, in a sixth implementation manner of the fifth aspect, the BLUETOOTH connection information of the second device includes a frequency hopping timeslot of the second device, and obtaining, according to the BLUETOOTH connection information, a BLUETOOTH signal sent by the second device includes sending a paging message in the frequency hopping timeslot of the second device, receiving a paging response message of the paging message, where a time interval between the paging response message and the paging message is less than a preset time, establishing a BLUETOOTH connection to the second device, and receiving the BLUETOOTH signal sent by the second device.

According to a sixth aspect, a third device is provided, including a memory, one or more processors, and one or more programs, where the one or more programs are stored in the memory and configured to be executed by the one or more processors, the one or more programs include an instruction, and the instruction is used to obtain BLUETOOTH connection information of a second device, send the BLUETOOTH connection information of the second device to a first device, receive position information of the second device that is sent by the first device, where the position information of the second device is determined by the first device according to a BLUETOOTH signal that is sent by the second device and that is obtained by the first device according to the BLUETOOTH connection information of the second device, and report the position information of the second device.

With reference to the sixth aspect, in a first implementation manner of the sixth aspect, obtaining BLUETOOTH connection information of a second device includes performing device discovery with the second device, or establishing a BLUETOOTH connection to the second device, and receiving the BLUETOOTH connection information of the second device that is sent by the second device.

It can be learned from the foregoing technical solutions that the embodiments of the present disclosure have the following advantages.

Because a first device can measure an angle of a received radio signal, but an existing third device uses a single antenna structure, and position of a second device cannot be tracked, BLUETOOTH connection information of the second device can be obtained using the first device. In this way, the first device can obtain, according to the BLUETOOTH connection information of the second device, a BLUETOOTH signal sent by the second device, and can further determine position information of the second device according to the BLUETOOTH signal, and send the position information of the second device to the third device such that the third device can report the position information of the second device to a user, thereby providing the user with a method for searching for a second device intuitively and quickly.

DESCRIPTION OF EMBODIMENTS

Embodiments of the present disclosure provide a device position obtaining method and a device in order to provide a user with a method for searching for a second device intuitively and quickly.

To make persons skilled in the art understand the technical solutions in the present disclosure better, the following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The terms "include," "contain" and any other variants in the specification, claims, and the accompanying drawings of the present disclosure mean to cover the non-exclusive inclusion, for example, a process, method, system, product, or device that includes a list of steps or units is not necessarily limited to those units, but may include other units not expressly listed or inherent to such a process, method, system, product, or device.

For a clear description, in this specification, establishing a BLUETOOTH connection between two devices means establishing a BLUETOOTH link between the two devices, and either of the two devices may, using the BLUETOOTH link, send a signal to the other device or receive a signal sent by the other device, and the signal is referred to as a BLUETOOTH signal.

Figure 1A:
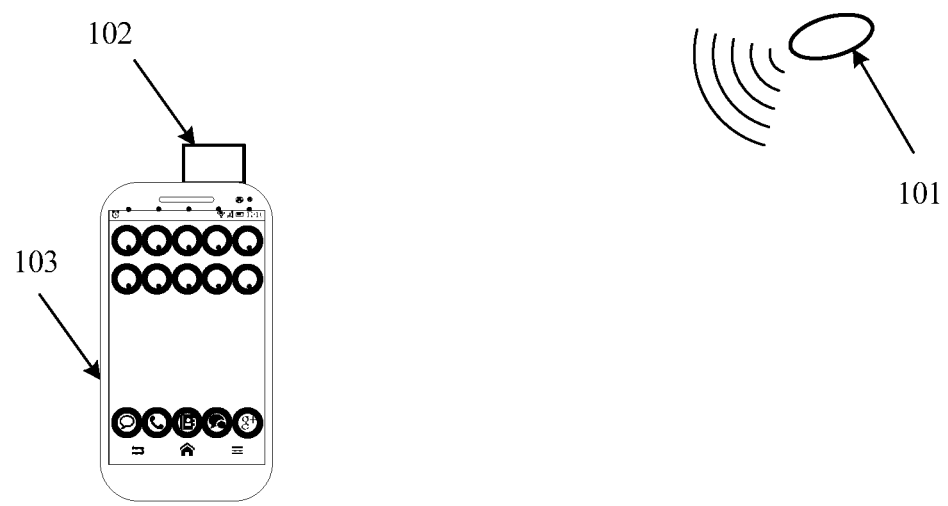
FIG. 1A is a diagram of an application scenario of obtaining a device position according to the present disclosure.

For ease of understanding the present disclosure, the following first describes an application scenario of a device position obtaining method of the present disclosure. As shown in FIG. 1A, FIG. 1A is a diagram of an application scenario of obtaining a device position according to the present disclosure. A second device 101 is a BLUETOOTH device. The second device 101 is attached to an article or a person (such as a child or a senior citizen) that a user needs to track. When the article or the person is lost, the user starts a first device 102.

Figure 1B:
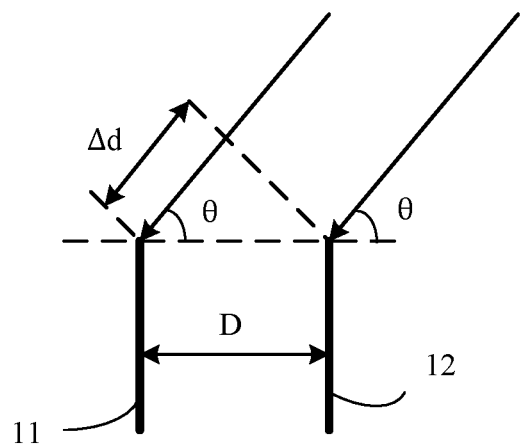
FIG. 1B is a schematic diagram of a principle of a phase method.

The first device 102 is a BLUETOOTH device on which multiple antennas are disposed, can receive a BLUETOOTH signal, and calculate a receiving angle of the received BLUETOOTH signal. The receiving angle refers to an angle between a propagation direction and an antenna when the BLUETOOTH signal reaches the antenna of the first device 102. The first device 102 may calculate the receiving angle using multiple methods, for example, using a phase method or an amplitude method. The following uses the phase method as an example for description. After receiving the BLUETOOTH signal, the first device 102 obtains a wavelength of the BLUETOOTH signal, a wave path difference and a phase difference of the BLUETOOTH signal received by two neighboring antennas on the first device 102. As shown in FIG. 1B, FIG. 1B is a schematic diagram of a principle of a phase method. The wavelength of the BLUETOOTH signal received by the first device 102 is denoted as $\lambda$ (not shown), a baseline length between two neighboring antennas 11 and 12 on the first device 102 denoted as D, the wave path difference of the signal received by the two antennas denoted as $\Delta d$, the phase difference denoted as $\Phi$ (not shown), and a receiving angle of receiving a radio signal by the first device 102 is denoted as $\theta$. According to a formula $\Delta d/\lambda = \Phi/2\pi$ and a formula $\cos\theta = \Delta d/D$, it can be obtained that the receiving angle $\theta = \arccos(\Phi\lambda/2\pi D)$. Certainly, the first device 102 may further calculate the receiving angle of the received BLUETOOTH signal according to another method, and details are not described herein.

After calculating the receiving angle of the signal, the first device 102 can determine position information of a device that sends the signal relative to the first device 102. The position information of the second device 101 refers to a direction of the second device 101 relative to the first device 102.

After the user starts the first device 102, the first device 102 obtains BLUETOOTH connection information of the second device 101, and obtains, according to the BLUETOOTH connection information, a BLUETOOTH signal sent by the second device 101. The first device 102 determines the position information of the second device 101 according to the BLUETOOTH signal sent by the second device 101, and sends the position information to a third device 103.

After receiving the position information of the second device 101, the third device 103 reports the position information of the second device 101. There are multiple reporting methods, for example, the third device 103 uses a display screen to display the position information, or broadcasts the position information by means of voice. This is not limited herein. The third device 103 may be a device such as a mobile phone, a tablet computer, or a smart watch. This is not limited herein. The user may track the second device 101 according to the position information of the second device 101 that is reported by the third device 103 in order to track an article or a person to which the second device 101 is attached.

The following describes a device position obtaining method of the present disclosure.

Figure 1C:
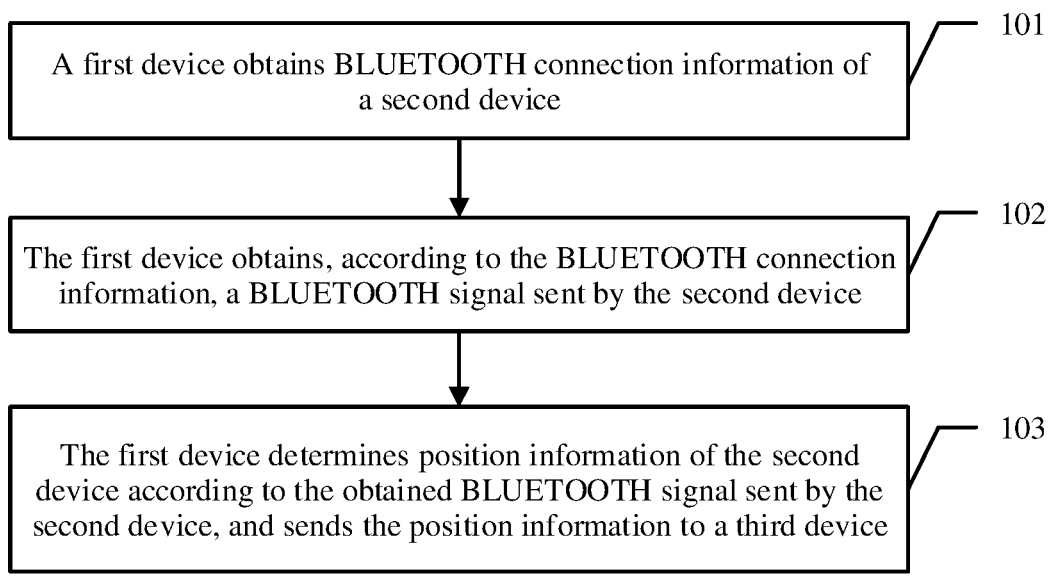
FIG. 1C is a flowchart of an embodiment of a device position obtaining method according to the present disclosure.

Referring to FIG. 1C, a device position obtaining method in an embodiment of the present disclosure includes the following steps.

Step 101: A first device obtains BLUETOOTH connection information of a second device.

In this embodiment, the BLUETOOTH connection information of the second device refers to information required to enable the first device to obtain the BLUETOOTH signal sent by the second device.

For example, if the first device first establishes a BLUETOOTH connection to the second device, and then obtains the BLUETOOTH signal sent by the second device, the BLUETOOTH connection information of the second device refers to information required to enable the first device to establish the BLUETOOTH connection to the second device. For example, the BLUETOOTH connection information of the second device may be a BLUETOOTH address, a frequency hopping timeslot, a device identifier, an access number, or the like of the second device.

Before the first device establishes the BLUETOOTH connection to the second device, the first device first performs device discovery with the second device, and then the first device establishes the BLUETOOTH connection to the discovered second device. There are multiple methods for discovering a device. In some of the methods for discovering a device, the first device receives a BLUETOOTH signal from the second device. Therefore, when the device discovery is performed using the some of the methods for discovering a device, the first device can determine, without establishing a BLUETOOTH connection to the second device, position information of the second device using the BLUETOOTH signal sent by the second device and received in a device discovery phase. In this case, the BLUETOOTH connection information of the second device refers to information required to enable the first device to discover the second device. For a detailed explanation, refer to the description in step 102.

There are multiple methods for the first device to obtain the BLUETOOTH connection information of the second device. For example, before the second device is lost, the first device obtains the BLUETOOTH connection information of the second device from the second device and stores the BLUETOOTH connection information of the second device. Alternatively, after the second device is lost, the first device obtains the BLUETOOTH connection information from a third device in which the BLUETOOTH connection information of the second device is stored.

There are multiple methods for the first device to obtain the BLUETOOTH connection information of the second device from the third device. For example, the first device establishes a BLUETOOTH connection to the third device, and then receives, using a BLUETOOTH link, the BLUETOOTH connection information of the second device sent by the third device. Alternatively, two interfaces that cooperate with each other are respectively disposed on the third device and the first device, when the two interfaces on the first device and the third device are connected to each other, the first device obtains the BLUETOOTH connection information of the second device from the third device using the interfaces.

Certainly, there is another method for the first device to obtain the BLUETOOTH connection information of the second device. This is not limited herein.

Step 102: The first device obtains, according to the BLUETOOTH connection information, a BLUETOOTH signal sent by the second device.

After receiving the BLUETOOTH connection information of the second device, the first device establishes a BLUETOOTH connection to the second device according to the BLUETOOTH connection information, and receives the BLUETOOTH signal sent by the second device after the BLUETOOTH connection is established.

Alternatively, the first device does not need to establish a BLUETOOTH connection to the second device, but only to perform device discovery with the second device according to the BLUETOOTH connection information, and obtain, during a device discovery process, the BLUETOOTH signal sent by the second device.

Further, for example, the BLUETOOTH connection information of the second device obtained by the first device includes a BLUETOOTH address of the second device. After obtaining the BLUETOOTH address of the second device, the first device adds the BLUETOOTH address to a listening table, and listens to, on a full BLUETOOTH band, the BLUETOOTH signal sent by a device in the listening table.

Alternatively, the BLUETOOTH connection information of the second device obtained by the first device includes a frequency hopping timeslot of the second device and a BLUETOOTH address of the second device.

After obtaining the BLUETOOTH connection information, the first device adds the BLUETOOTH address of the second device to a listening table, and listens to, in the frequency hopping timeslot of the second device, the BLUETOOTH signal sent by a device in the listening table. Compared with listening on a full BLUETOOTH band by the first device, in this way, the first device can more quickly obtain the BLUETOOTH signal sent by the second device.

Step 103: The first device determines position information of the second device according to the obtained BLUETOOTH signal sent by the second device, and sends the position information to a third device.

There are multiple methods for the first device to send the position information of the second device to the third device. For example, the first device establishes a BLUETOOTH connection to the third device, and then sends the position information of the second device to the third device using a BLUETOOTH link. Alternatively, two interfaces that cooperate with each other may be respectively disposed on the third device and the first device. The third device obtains the position information of the second device from the first device when the two interfaces on the first device and the third device are connected to each other.

In this embodiment, because a first device can measure an angle of a received radio signal, but an existing third device uses a single antenna structure, and position of a second device cannot be tracked, BLUETOOTH connection information of the second device can be obtained using the first device. In this way, the first device can obtain, according to the BLUETOOTH connection information of the second device, a BLUETOOTH signal sent by the second device, and can further calculate position information of the second device according to the BLUETOOTH signal, and send the position information of the second device to the third device such that the third device can report the position information of the second device to a user, thereby providing the user with a method for searching for a second device intuitively and quickly.

In an actual application, after receiving the BLUETOOTH signal of the second device, the first device may send information about the BLUETOOTH signal to the third device instead of calculating the receiving angle of the BLUETOOTH signal, and the third device calculates position information of the second device according to the information about the BLUETOOTH signal. This is not limited herein.

In this embodiment, a first device obtains BLUETOOTH connection information of a second device in order to obtain a BLUETOOTH signal sent by the second device according to the BLUETOOTH connection information. In an actual application, alternatively, the first device may send BLUETOOTH connection information of the first device to the second device such that the second device sends the BLUETOOTH signal to the first device according to the BLUETOOTH connection information of the first device.

There are multiple methods for the first device to send the BLUETOOTH connection information of the first device to the second device. For example, before the second device is lost, the first device can directly send the BLUETOOTH connection information of the first device to the second device.

Alternatively, after the second device is lost, the first device uses a third device to send the BLUETOOTH connection information of the first device to the second device, where a BLUETOOTH connection is established between the third device and the second device. Further, the first device establishes a BLUETOOTH connection to the third device, and then sends the BLUETOOTH connection information of the first device to the third device. The third device sends the BLUETOOTH connection information of the first device to the second device.

In the present disclosure, before a first device obtains a BLUETOOTH signal sent by a second device, the first device can first establish a BLUETOOTH connection to the second device according to BLUETOOTH connection information of the second device.

Figure 2:
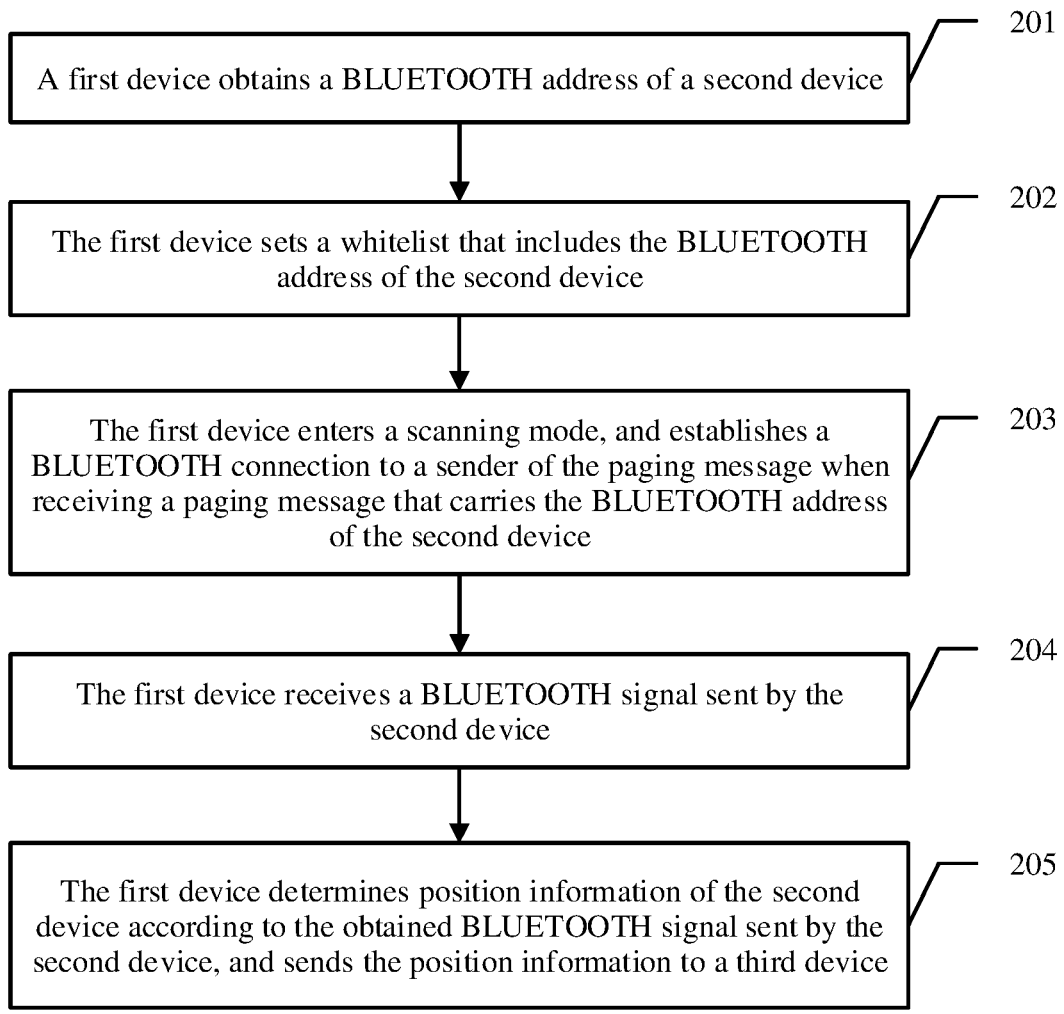
FIG. 2 is a flowchart of another embodiment of a device position obtaining method according to the present disclosure.

In an actual application, there are multiple methods for the first device to establish the BLUETOOTH connection to the second device according to the BLUETOOTH connection information of the second device. The following describes one of the methods in detail with reference to FIG. 2. Referring to FIG. 2, FIG. 2 is a flowchart of another embodiment of a device position obtaining method according to the present disclosure. The device position obtaining method in this embodiment includes the following steps.

Step 201: A first device obtains a BLUETOOTH address of a second device.

In this embodiment, BLUETOOTH connection information of the second device includes the BLUETOOTH address of the second device. The first device can obtain the BLUETOOTH address of the second device from a third device, where a BLUETOOTH connection is established between the third device and the second device, and the BLUETOOTH address of the second device is stored in the third device.

Further, the first device first establishes a BLUETOOTH connection to the third device. For example, two interfaces that cooperate with each other are respectively disposed on the third device and the first device. When the two interfaces on the first device and the third device are connected to each other, the third device enables a BLUETOOTH function and switches a BLUETOOTH mode to "search for a nearby device," and the first device starts and automatically sets the BLUETOOTH mode to "discoverable by a nearby device." The third device discovers the first device, and establishes a BLUETOOTH connection to the first device.

Alternatively, an enabling button is disposed on the first device such that a BLUETOOTH mode is automatically set to "discoverable by a nearby device" after the first device is started. The third device enables a BLUETOOTH function and switches the BLUETOOTH mode to "search for a nearby device," discovers the first device, and establishes a BLUETOOTH connection to the first device. The first device receives a BLUETOOTH address of the second device sent by the third device.

Alternatively, the first device does not need to establish a BLUETOOTH connection to the third device. For example, if two interfaces that cooperate with each other are respectively disposed on the third device and the first device, when the two interfaces on the first device and the third device are connected to each other, the third device sends the BLUETOOTH address of the second device to the first device using the connected interfaces.

Step 202: The first device sets a whitelist that includes the BLUETOOTH address of the second device.

Step 203: The first device enters a scanning mode, and establishes a BLUETOOTH connection to a sender of the paging message when receiving a paging message that carries the BLUETOOTH address of the second device.

A BLUETOOTH device can perform device discovery in two modes a paging mode and a scanning mode. The paging mode means that a paging message that carries a BLUETOOTH address of a sender is sent to the outside. The scanning mode means that a paging message sent by the BLUETOOTH device is received, but no BLUETOOTH message is sent to the outside.

In this embodiment, the first device enters the scanning mode after the whitelist is set, and the second device enters the paging mode. The first device receives paging messages, and matches BLUETOOTH addresses carried in all the received paging messages with BLUETOOTH addresses in the whitelist. When matching succeeds, the first device can determine that the successfully matched paging message is from the second device, and establish the BLUETOOTH connection to the second device. Further, when matching succeeds, the first device sends a paging response message of the paging message to the second device, and the first device and the second device establish a pairing connection when the paging response message is received by the second device.

Step 204: The first device receives a BLUETOOTH signal sent by the second device.

Step 205: The first device determines position information of the second device according to the obtained BLUETOOTH signal sent by the second device, and sends the position information to a third device.

For a detailed description, refer to the description in step 103 in the embodiment shown in FIG. 1C.

Figure 3:
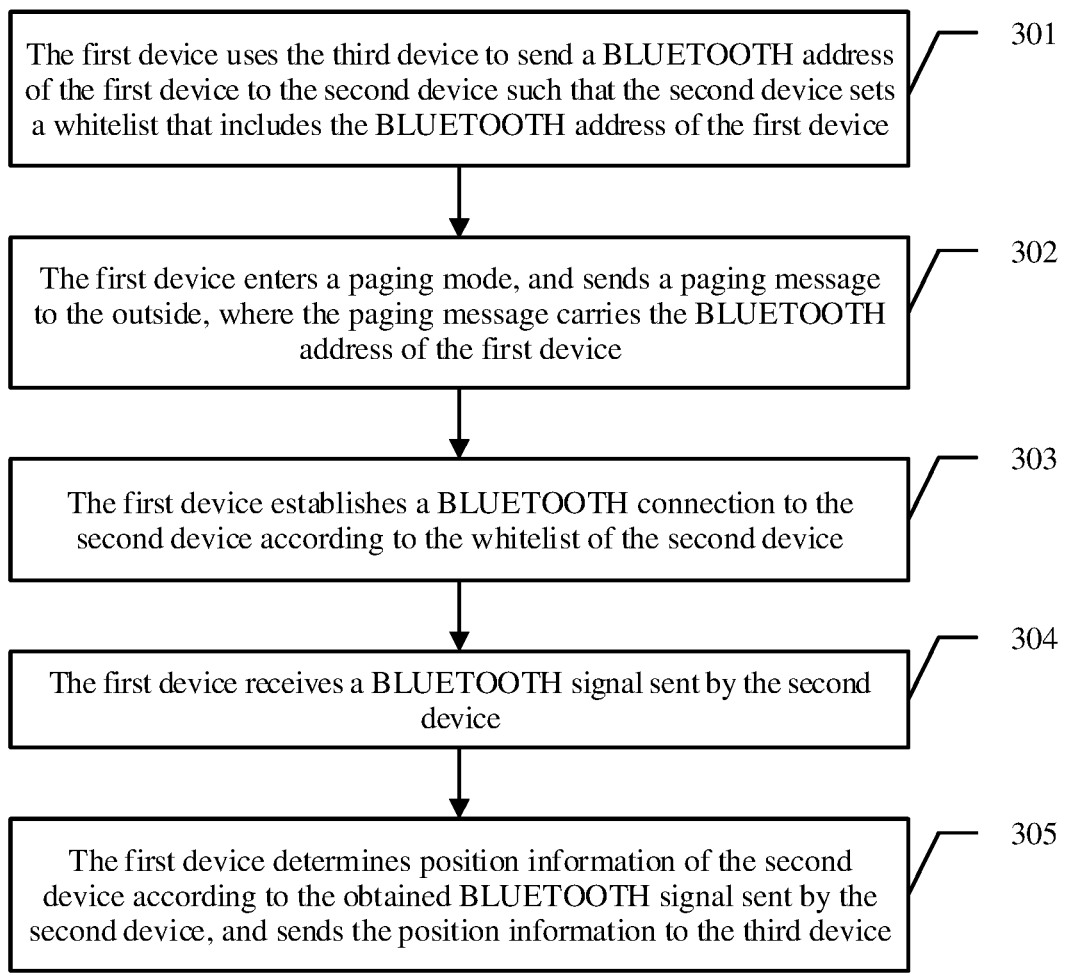
FIG. 3 is a flowchart of another embodiment of a device position obtaining method according to the present disclosure.

In this embodiment, after obtaining a BLUETOOTH address of a second device, a first device establishes a whitelist that includes the BLUETOOTH address, and establishes a BLUETOOTH connection to a sender (that is, the second device) of the paging message when receiving a paging message that carries the BLUETOOTH address. That is, in a device discovery phase, the first device is in the scanning mode, and the second device is in the paging mode. In an actual application, alternatively, in the device discovery phase, the first device may be in the paging mode, and the second device may be in the scanning mode. The following describes a device position obtaining method in detail with reference to FIG. 3. Referring to FIG. 3, FIG. 3 is a flowchart of another embodiment of a device position obtaining method according to the present disclosure. The device position obtaining method in this embodiment includes the following steps.

Step 301: The first device uses the third device to send a BLUETOOTH address of the first device to the second device such that the second device sets a whitelist that includes the BLUETOOTH address of the first device.

Further, the first device first establishes a BLUETOOTH connection to the third device in order to send the BLUETOOTH address of the first device to the third device using a BLUETOOTH link. For a detailed connection method, refer to the explanation and the description in step 201 in the embodiment shown in FIG. 2. Details are not described herein again.

Alternatively, the first device does not need to establish a BLUETOOTH connection to the third device. If two interfaces that cooperate with each other are respectively disposed on the third device and the first device, when the two interfaces on the first device and the third device are connected to each other, the third device reads a BLUETOOTH address of a multi-antenna array apparatus using the connected interfaces.

In this embodiment, the third device establishes a BLUETOOTH connection to the second device. The third device sends the obtained BLUETOOTH address of the first device to the second device such that the second device sets the whitelist that includes the BLUETOOTH address of the first device.

Step 302: The first device enters a paging mode, and sends a paging message to the outside, where the paging message carries the BLUETOOTH address of the first device.

After the BLUETOOTH address of the first device is sent to the third device, the first device enters the paging mode, and sends the paging message that carries the BLUETOOTH address of the first device to the outside. After creating the whitelist, the second device enters a scanning mode to receive the paging message.

Step 303: The first device establishes a BLUETOOTH connection to the second device according to the whitelist of the second device.

The second device matches BLUETOOTH addresses carried in all the received paging messages with BLUETOOTH addresses in the whitelist. When the matching succeeds, the second device determines that the successfully matched paging message is from the first device, and establishes a BLUETOOTH connection to the first device. Further, when the matching succeeds, the second device sends a paging response message of the paging message to the first device, and the second device and the first device establish a pairing connection after the first device receives the paging response message.

Step 304: The first device receives a BLUETOOTH signal sent by the second device.

Step 305: The first device determines position information of the second device according to the obtained BLUETOOTH signal sent by the second device, and sends the position information to the third device.

For a detailed description, refer to the description in step 103 in the embodiment shown in FIG. 1C.

Figure 4:
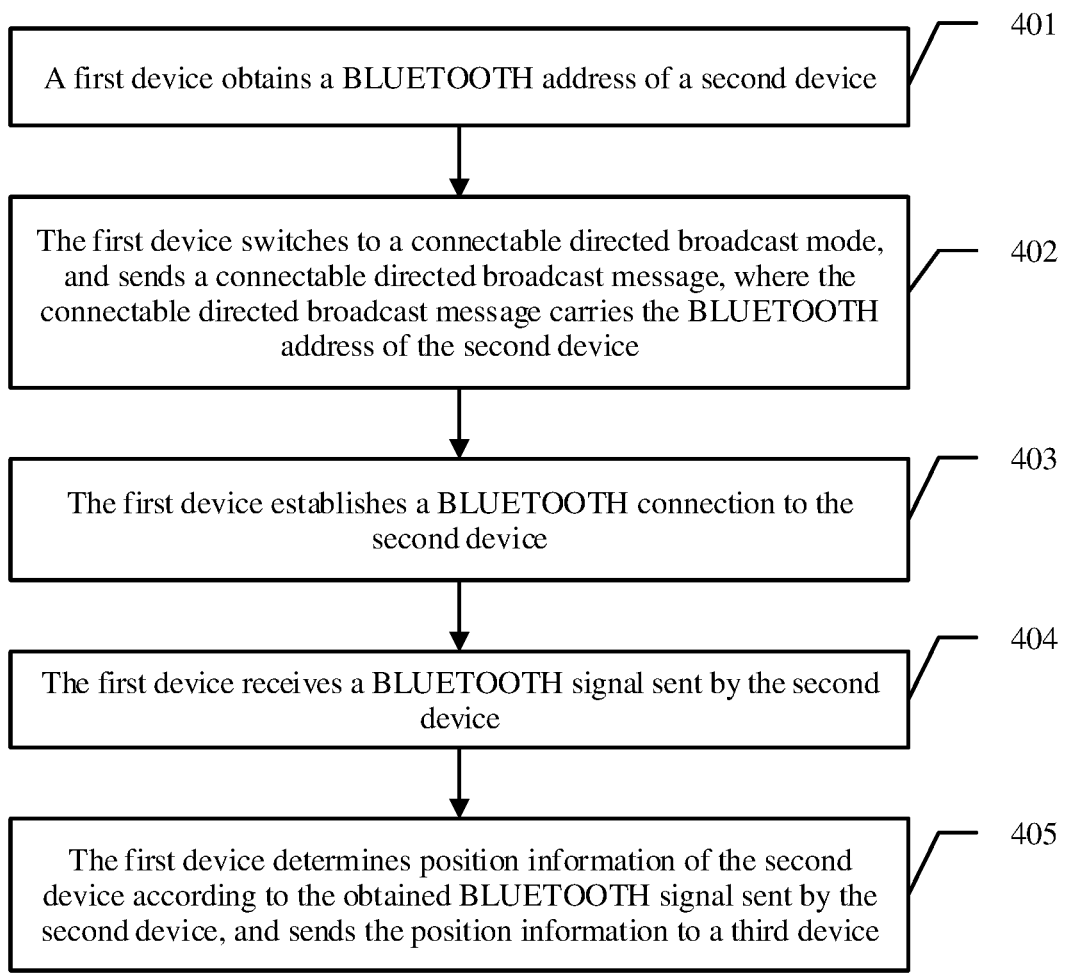
FIG. 4 is a flowchart of another embodiment of a device position obtaining method according to the present disclosure.

In the embodiments shown in FIG. 2 and FIG. 3, the first device and the second device perform the device discovery by cooperatively using the scanning mode and the paging mode. In an actual application, the BLUETOOTH connection may further be established between the first device and the second device using another method. With reference to FIG. 4, the following describes another method in which a first device establishes a BLUETOOTH connection to a second device according to BLUETOOTH connection information of the second device. Referring to FIG. 4, FIG. 4 is a flowchart of another embodiment of a device position obtaining method according to the present disclosure. The device position obtaining method in this embodiment includes the following steps.

Step 401: A first device obtains a BLUETOOTH address of a second device.

In this embodiment, BLUETOOTH connection information of the second device includes the BLUETOOTH address of the second device. For a detailed description, refer to the description in step 201 in the embodiment shown in FIG. 2.

Step 402: The first device switches to a connectable directed broadcast mode, and sends a connectable directed broadcast message, where the connectable directed broadcast message carries the BLUETOOTH address of the second device.

A BLUETOOTH device sends the connectable directed broadcast message in the connectable directed broadcast mode. The connectable directed broadcast message includes both a BLUETOOTH address of an "advertiser" (that is, the BLUETOOTH device) and a BLUETOOTH address of an "initiator." Only a BLUETOOTH device that has the BLUETOOTH address of the "initiator" in the connectable directed broadcast message can initiate a connection request to the "advertiser."

Step 403: The first device establishes a BLUETOOTH connection to the second device.

The first device sends the connectable directed broadcast message that carries the BLUETOOTH address of the second device. A BLUETOOTH device that receives the connectable directed broadcast message detects whether the BLUETOOTH address carried in the broadcast message is consistent with a BLUETOOTH address of the BLUETOOTH device. The broadcast message is discarded if the BLUETOOTH address carried in the broadcast message is inconsistent with the BLUETOOTH address of the BLUETOOTH device, or a connection request is initiated to the first device if the BLUETOOTH address carried in the broadcast message is consistent with the BLUETOOTH address of the BLUETOOTH device. In this way, the second device may establish a BLUETOOTH connection to the first device after receiving the connectable directed broadcast message.

Step 404: The first device receives a BLUETOOTH signal sent by the second device.

Step 405: The first device determines position information of the second device according to the obtained BLUETOOTH signal sent by the second device, and sends the position information to a third device.

For a detailed description, refer to the description in step 103 in the embodiment shown in FIG. 1C.

In this embodiment, after obtaining a BLUETOOTH address of a second device, a first device switches to a connectable directed broadcast mode, and sends a connectable directed broadcast message that carries the BLUETOOTH address of the second device such that after receiving the connectable directed broadcast message, the second device establishes a BLUETOOTH connection to the first device.

In an actual application, alternatively, the first device may use the third device to send a BLUETOOTH address of the first device to the second device such that after receiving the BLUETOOTH address of the first device, the second device switches to a connectable directed broadcast mode, and sends a connectable directed broadcast message that carries the BLUETOOTH address of the first device. After receiving the connectable directed broadcast message, the first device establishes a BLUETOOTH connection to the second device. For a detailed description, refer to the explanation and the description in step 402 to step 405. Details are not described herein again. The first device receives a BLUETOOTH signal sent by the second device.

Figure 5:
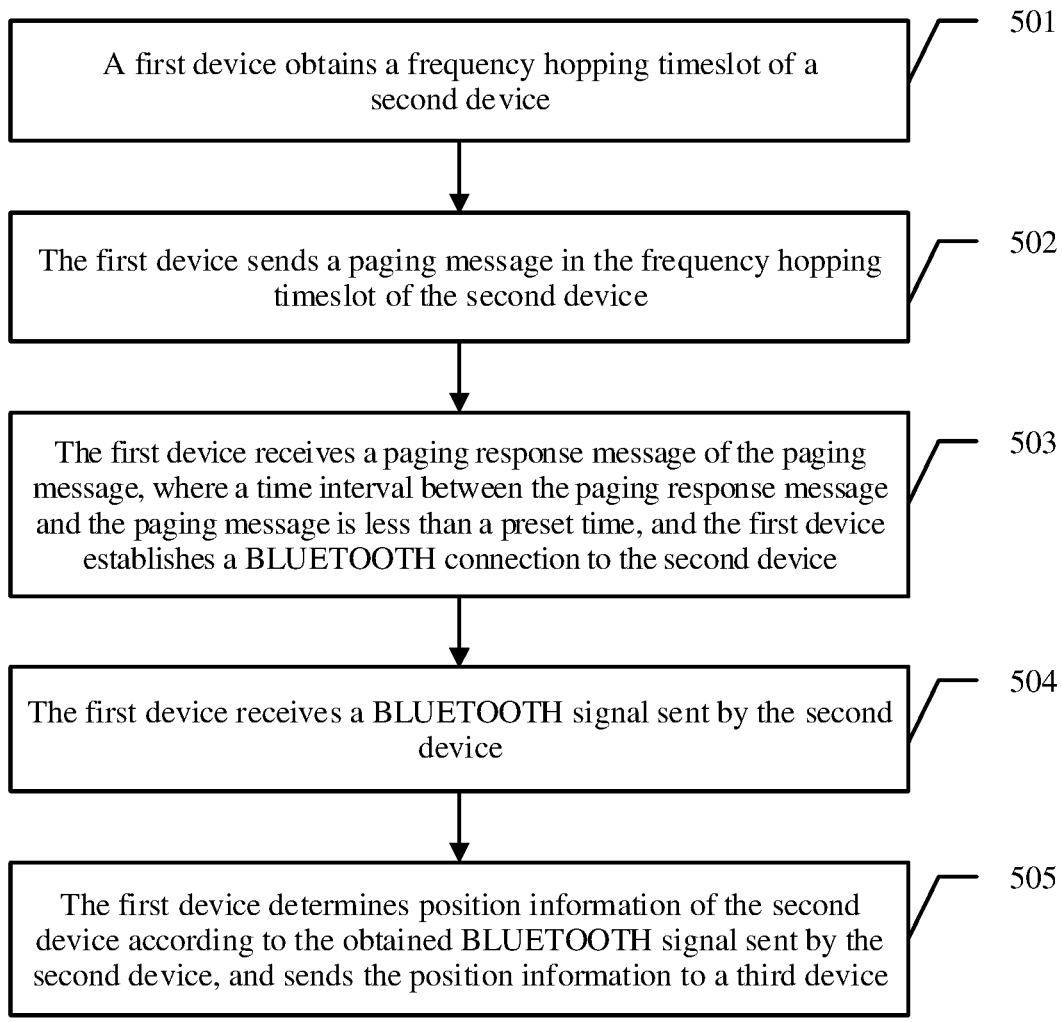
FIG. 5 is a flowchart of another embodiment of a device position obtaining method according to the present disclosure.

With reference to FIG. 5, the following describes another method in which a first device establishes a BLUETOOTH connection to a second device according to BLUETOOTH connection information of the second device. Referring to FIG. 5, FIG. 5 is a flowchart of another embodiment of a device position obtaining method according to the present disclosure. The device position obtaining method in this embodiment includes the following steps.

Step 501: A first device obtains a frequency hopping timeslot of a second device.

In this embodiment, BLUETOOTH connection information of the second device includes the frequency hopping timeslot of the second device.

For ease of description, the following gives an explanation on a BLUETOOTH device. When a pair of BLUETOOTH devices is performing BLUETOOTH communication, one BLUETOOTH device serves as a primary device, and the other BLUETOOTH device serves as a secondary device. The primary device is in a paging mode, and the secondary device is in a scanning mode. The primary device performs device discovery with the secondary device and performs frequency hopping timeslot synchronization on the secondary device such that a frequency hopping timeslot of the secondary device is the same as a frequency hopping timeslot of the primary device. Then, the primary device establishes a BLUETOOTH connection to the secondary device. In this way, the primary device and the secondary device are located in a same BLUETOOTH piconet, and perform BLUETOOTH communication in a same frequency hopping timeslot.

In this embodiment, there are multiple methods for the first device to obtain the frequency hopping timeslot of the second device. Further, the first device receives a BLUETOOTH connection initiated by a third device, where a BLUETOOTH connection is established between the third device and the second device, and the third device and the second device have a same frequency hopping timeslot. In this way, the first device and the third device are located in a same BLUETOOTH piconet. The third device serves as the primary device, and the first device serves as the secondary device. The frequency hopping timeslot of the first device is the same as the frequency hopping timeslot of the third device, that is, the frequency hopping timeslot of the first device is the same as a frequency hopping timeslot of the second device.

After the first device establishes the BLUETOOTH connection to the third device, the first device serves as the secondary device. To enable the first device to perform the device discovery with the second device in the frequency hopping timeslot of the second device (that is, the frequency hopping timeslot of the third device), a role played by the first device needs to be switched from the secondary device to the primary device. Therefore, the first device receives a role switching request initiated by the third device such that the first device can switch to serve as the primary device. Because a role played by the third device is changed to the secondary device, the BLUETOOTH connection between the third device and the second device is disconnected.

The foregoing is a method in which a first device obtains a frequency hopping timeslot of a second device. Certainly, the foregoing is merely an example, and no limitation is imposed.

Step 502: The first device sends a paging message in the frequency hopping timeslot of the second device.

Step 503: The first device receives a paging response message of the paging message, where a time interval between the paging response message and the paging message is less than a preset time, and the first device establishes a BLUETOOTH connection to the second device.

When BLUETOOTH devices that do not have a same frequency hopping timeslot perform device discovery, a time interval from sending the paging message by the primary device to receiving the paging response message by the primary device is relatively long, or when BLUETOOTH devices that have a same frequency hopping timeslot perform device discovery, a time interval from sending the paging message by the primary device to receiving the paging response message by the primary device is relatively short.

Because the first device and the second device have a same frequency hopping timeslot, when the time interval from sending the paging message by the first device to receiving the paging response message by the first device is less than the preset time, it can be determined that the paging response message is from the second device, and the first device establishes the BLUETOOTH connection to the second device.

Step 504: The first device receives a BLUETOOTH signal sent by the second device.

Step 505: The first device determines position information of the second device according to the obtained BLUETOOTH signal sent by the second device, and sends the position information to a third device.

For a detailed description, refer to the description in step 103 in the embodiment shown in FIG. 1C.

The foregoing embodiments describe in detail a device position obtaining method of the present disclosure from a first device side. The following describes in detail the device position obtaining method of the present disclosure from a third device side.

Figure 6:
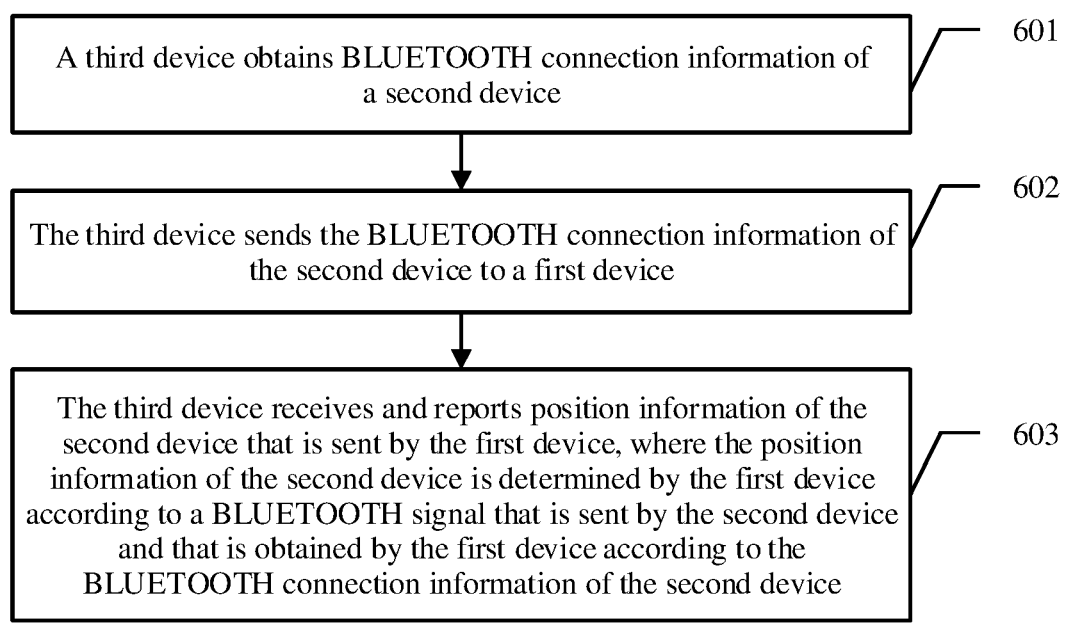
FIG. 6 is a flowchart of another embodiment of a device position obtaining method according to the present disclosure.

Referring to FIG. 6, a device position obtaining method in an embodiment of the present disclosure includes the following steps.

Step 601: A third device obtains BLUETOOTH connection information of a second device.

The third device searches for nearby BLUETOOTH devices, and sends a connection request to a second device when the second device is found. The second device receives the connection request, and establishes a BLUETOOTH connection to the third device. After establishing the BLUETOOTH connection to the second device, the third device can obtain the BLUETOOTH connection information of the second device.

In some cases, the third device can obtain the BLUETOOTH connection information of the second device in a device discovery phase without establishing the BLUETOOTH connection to the second device. For example, when the BLUETOOTH connection information includes a frequency hopping timeslot, after the second device is found, the third device performs frequency hopping timeslot synchronization on the second device such that a frequency hopping timeslot of the second device is consistent with a frequency hopping timeslot of the third device. In this way, the third device can obtain the frequency hopping timeslot of the second device without establishing the BLUETOOTH connection to the second device.

Step 602: The third device sends the BLUETOOTH connection information of the second device to a first device.

There are multiple methods that can be used by the third device to send the BLUETOOTH connection information of the second device to the first device. For example, the third device first establishes a BLUETOOTH connection to the first device. For a detailed BLUETOOTH connection method, refer to the explanation and the description in step 201 in the embodiment shown in FIG. 2. Details are not described herein again.

Alternatively, the third device may not establish the BLUETOOTH connection to the first device, but send the BLUETOOTH connection information of the second device to the first device in the device discovery phase. Further, for example, the frequency hopping timeslot of the third device is the same as the frequency hopping timeslot of the second device. After the first device is found, the third device performs the frequency hopping timeslot synchronization on the first device such that the frequency hopping timeslot of the first device is consistent with the frequency hopping timeslot of the third device, that is, the frequency hopping timeslot of the first device is consistent with the frequency hopping timeslot of the second device. In this way, the third device can send the frequency hopping timeslot of the second device to the first device without establishing the BLUETOOTH connection to the first device.

Alternatively, if two interfaces that cooperate with each other are respectively disposed on the third device and the first device, when the two interfaces on the first device and the third device are connected to each other, the third device sends a BLUETOOTH address of the second device to the first device using the connected interfaces.

Certainly, the foregoing is merely an example of a method in which the third device sends the BLUETOOTH connection information of the second device to the first device. This is not limited herein.

Step 603: The third device receives and reports position information of the second device that is sent by the first device, where the position information of the second device is determined by the first device according to a BLUETOOTH signal that is sent by the second device and that is obtained by the first device according to the BLUETOOTH connection information of the second device.

After receiving the BLUETOOTH connection information of the second device sent by the third device, the first device obtains, according to the BLUETOOTH connection information, the BLUETOOTH signal sent by the second device, calculates the position information of the second device, and sends the position information to the third device. The third device receives the position information of the second device that is sent by the first device, and reports the position information. There are multiple reporting methods, for example, the position information is displayed on a display screen, or the position information is broadcast by voice. This is not limited herein.

In this embodiment, because a first device can measure an angle of a received radio signal, but an existing third device uses a single antenna structure, and position of a second device cannot be tracked, BLUETOOTH connection information of the second device can be obtained using the first device. In this way, the first device can obtain, according to the BLUETOOTH connection information of the second device, a BLUETOOTH signal sent by the second device, and can further calculate position information of the second device according to the BLUETOOTH signal, and send the position information of the second device to the third device such that the third device can report the position information of the second device to a user, thereby providing the user with a method for searching for a second device intuitively and quickly.

In this embodiment, the third device obtains and sends the BLUETOOTH connection information of the second device, and sends the BLUETOOTH connection information of the second device to the first device such that the first device obtains, according to the BLUETOOTH connection information of the second device, the BLUETOOTH signal sent by the second device.

In an actual application, alternatively, the third device may obtain BLUETOOTH connection information of the first device, and send the BLUETOOTH connection information of the first device to the second device such that the second device sends the BLUETOOTH signal to the first device according to the BLUETOOTH connection information of the first device. A method in which the third device obtains the BLUETOOTH connection information of the first device may be consistent with the method in which the third device obtains the BLUETOOTH connection information of the second device, and the method in which the third device sends the BLUETOOTH connection information of the first device to the second device may be consistent with the method in which the third device sends the BLUETOOTH connection information of the second device to the first device. Details are not described herein again.

Figure 7:
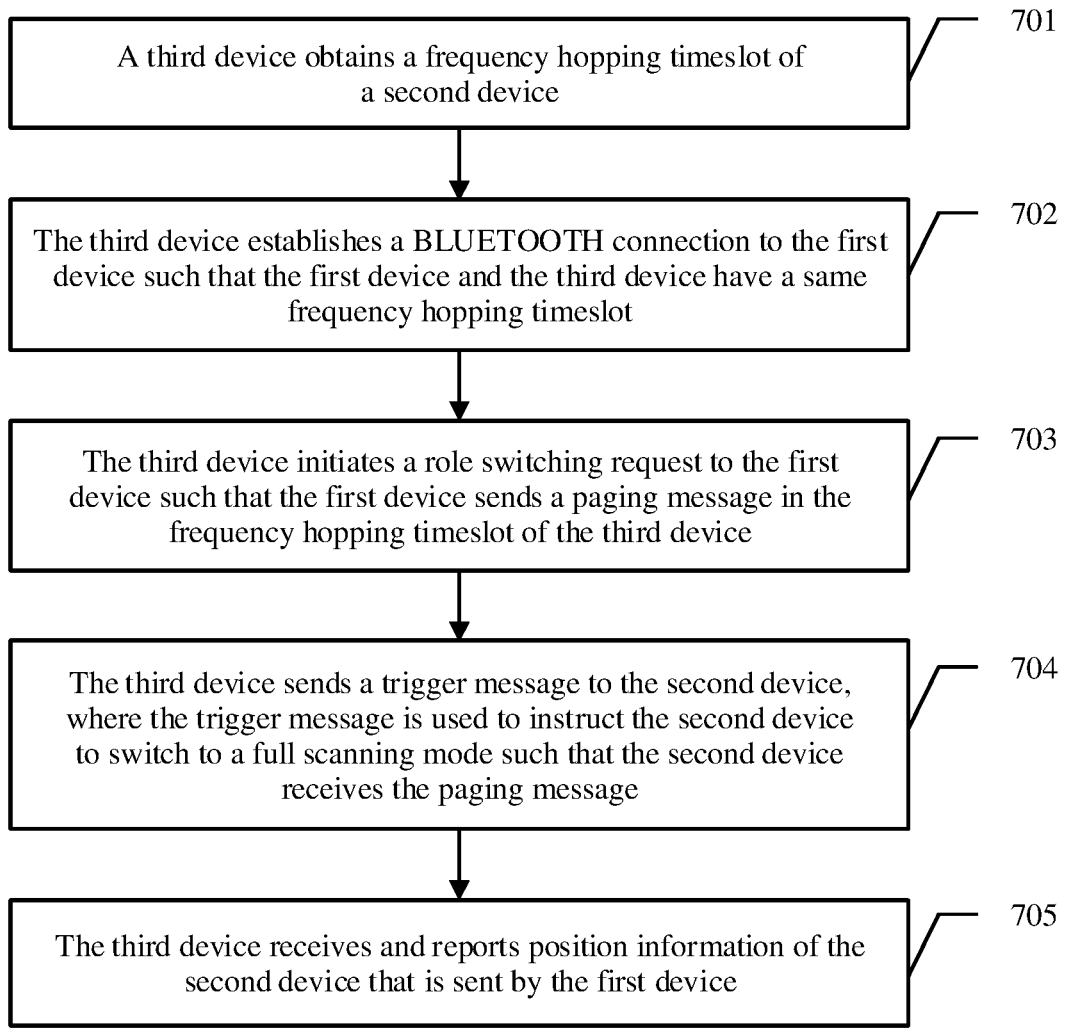
FIG. 7 is a flowchart of another embodiment of a device position obtaining method according to the present disclosure.

In this embodiment, there are multiple methods for the third device to send the BLUETOOTH connection information of the second device to the first device. The following describes one of the methods in detail with reference to FIG. 7. Referring to FIG. 7, FIG. 7 is a flowchart of another embodiment of a device position obtaining method according to the present disclosure. The device position obtaining method in this embodiment includes the following steps.

Step 701: A third device obtains a frequency hopping timeslot of a second device.

In this embodiment, BLUETOOTH connection information of the second device includes the frequency hopping timeslot of the second device. The third device establishes a BLUETOOTH connection to the second device such that the frequency hopping timeslot of the second device is consistent with a frequency hopping timeslot of the third device. For a detailed description, refer to the description in step 601 in the embodiment shown in FIG. 6. Details are not described herein again.

Step 702: The third device establishes a BLUETOOTH connection to the first device such that the first device and the third device have a same frequency hopping timeslot.

For a detailed description, refer to the description in step 501 in the embodiment shown in FIG. 5.

Step 703: The third device initiates a role switching request to the first device such that the first device sends a paging message in the frequency hopping timeslot of the third device.

After the third device establishes the BLUETOOTH connection to the first device, to enable the first device to send the paging message in the frequency hopping timeslot of the third device, the third device sends the role switching request to the first device. The first device receives the role switching request, and completes the role switching.

Step 704: The third device sends a trigger message to the second device, where the trigger message is used to instruct the second device to switch to a full scanning mode such that the second device receives the paging message.

In addition to initiating the role switching to the first device, the third device sends the trigger message to the second device in order to instruct the second device to switch to the full scanning mode. Because a role played by the third device is changed from a primary device to a secondary device, the BLUETOOTH connection between the third device and the second device is further disconnected.

After switching to serve as the primary device, the first device can send the paging message in the frequency hopping timeslot of the first device (that is, the frequency hopping timeslot of the second device) such that the second device can receive the paging message in a preset time. For a detailed description, refer to the description in step 503 in the embodiment shown in FIG. 5. Details are not described herein again.

Step 705: The third device receives and reports position information of the second device that is sent by the first device.

For a detailed description, refer to the description in step 603 in the embodiment shown in FIG. 6.

The foregoing embodiments describe in detail a device position obtaining method of the present disclosure from a first device side and a third device side. The following describes in detail the device position obtaining method of the present disclosure from a second device side.

Figure 8:
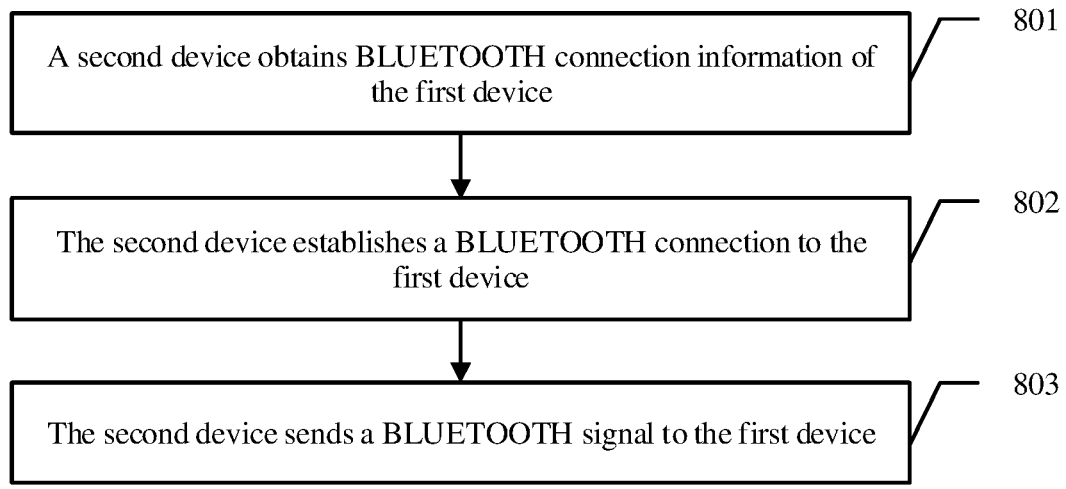
FIG. 8 is a flowchart of another embodiment of a device position obtaining method according to the present disclosure.

Referring to FIG. 8, a device position obtaining method in an embodiment of the present disclosure includes the following steps.

Step 801: A second device obtains BLUETOOTH connection information of the first device.

In this embodiment, there are multiple methods for the second device to obtain the BLUETOOTH connection information of the first device. Further, the second device establishes a BLUETOOTH connection to a third device, where the BLUETOOTH connection information of the first device is stored in the third device. The second device obtains the BLUETOOTH connection information of the first device from the third device.

Step 802: The second device establishes a BLUETOOTH connection to the first device.

After obtaining the BLUETOOTH connection information of the first device, the second device establishes the BLUETOOTH connection to the first device according to the BLUETOOTH connection information. In an actual application, there are multiple methods for the second device to establish the BLUETOOTH connection to the first device.

For example, the BLUETOOTH connection information of the first device further includes a BLUETOOTH address of the first device. After obtaining the BLUETOOTH address of the first device, the second device sets a whitelist that includes the BLUETOOTH address of the first device. In addition, the first device is in a paging mode, and sends a paging message that carries the BLUETOOTH address of the first device to the outside. After setting the whitelist, the second device enters a scanning mode, and establishes the BLUETOOTH connection to the first device when receiving the paging message that carries the BLUETOOTH address of the first device.

Alternatively, the BLUETOOTH connection information of the first device further includes a BLUETOOTH address of the first device. After obtaining the BLUETOOTH address of the first device, the second device switches to a connectable directed broadcast mode, and sends a connectable directed broadcast message, where the connectable directed broadcast message carries the BLUETOOTH address of the first device such that after receiving the connectable directed broadcast message, the first device establishes the BLUETOOTH connection to the second device.

Step 803: The second device sends a BLUETOOTH signal to the first device.

After establishing the BLUETOOTH connection to the first device, the second device sends the BLUETOOTH signal to the first device such that the first device calculates position information of the second device according to the BLUETOOTH signal. For a detailed description, refer to the description in step 103 in the embodiment shown in FIG. 1C. Details are not described herein again.

In this embodiment, a second device obtains BLUETOOTH connection information of a first device in order to send a BLUETOOTH signal to the first device according to the BLUETOOTH connection information. In an actual application, alternatively, the second device may send BLUETOOTH connection information of the second device to the first device such that the first device obtains, according to the BLUETOOTH connection information of the second device, the BLUETOOTH signal sent by the second device. Further, the first device establishes a BLUETOOTH connection to the second device according to the BLUETOOTH connection information of the second device, and then the second device sends the BLUETOOTH signal to the first device.

For example, the BLUETOOTH connection information of the second device includes a BLUETOOTH address of the second device. The second device uses a third device to send the BLUETOOTH address of the second device to the first device. Further, the second device establishes a BLUETOOTH connection to the third device in order to send the BLUETOOTH address of the second device to the third device. The third device further establishes a BLUETOOTH connection to the first device in order to send the BLUETOOTH address of the second device to the first device. After obtaining the BLUETOOTH address of the second device, the first device sets a whitelist that includes the BLUETOOTH address of the second device, and enters a scanning mode.

The second device enters a paging mode, and sends a paging message to the outside, where the paging message carries the BLUETOOTH address of the second device. The second device establishes a BLUETOOTH connection to the first device according to the whitelist of the first device. Further, the first device receives paging messages, and matches BLUETOOTH addresses carried in all the received paging messages with BLUETOOTH addresses in the whitelist. When the matching succeeds, the first device can determine that the successfully matched paging message is from the second device, and establish the BLUETOOTH connection to the second device. Further, when matching succeeds, the first device sends a paging response message of the paging message to the second device, and the first device and the second device establish a pairing connection when the paging response message is received by the second device. The second device sends the BLUETOOTH signal to the first device.

For another example, the BLUETOOTH connection information of the second device includes a BLUETOOTH address of the second device. Further, the second device establishes the BLUETOOTH connection to the first device using the following method After receiving the BLUETOOTH address of the second device, the first device switches to a connectable directed broadcast mode, and sends a connectable directed broadcast message, where the connectable directed broadcast message carries the BLUETOOTH address of the second device.

The second device receives the connectable directed broadcast message, and determines that the connectable directed broadcast message is from the first device when the received connectable directed broadcast message carries the BLUETOOTH address of the second device. The second device establishes the BLUETOOTH connection to the first device. The second device sends the BLUETOOTH signal to the first device.

For another example, the BLUETOOTH connection information of the second device includes a frequency hopping timeslot of the second device. After the second device uses a third device to send the frequency hopping timeslot of the second device to the first device, the second device receives a trigger message sent by the third device, where the trigger message is used to instruct the second device to switch to a full scanning mode. The second device switches to the full scanning mode. After receiving the frequency hopping timeslot of the second device, the first device sends a paging message in the frequency hopping timeslot. The second device sends a paging response message in the frequency hopping timeslot of the second device when receiving the paging message.

Because the first device and the second device have a same frequency hopping timeslot, a time interval from sending the paging message by the first device and receiving the paging response message by the first device is relatively short. When the time interval from sending the paging message by the first device to receiving the paging response message by the first device is less than the preset time, it can be determined that the paging response message is from the second device, and the first device establishes the BLUETOOTH connection to the second device. The second device sends the BLUETOOTH signal to the first device.

For ease of understanding, the following describes a method in the embodiments of the present disclosure using an actual application scenario.

In this embodiment, an interface is disposed on a third device (for example, a mobile phone), where the interface is a Micro universal serial bus (USB) interface or a 3.5 millimeters (mm) audio interface. A second device is disposed in a wallet of a user, and a BLUETOOTH connection between the third device and the second device is established by the user. In this embodiment, a Micro USB interface or a 3.5 mm audio interface that matches the interface of the third device is disposed on the first device. When the user finds that the wallet is lost, the user inserts the first device into the Micro USB interface or the 3.5 mm audio interface of the third device, and the first device performs data interaction with the third device using the Micro USB interface or the 3.5 mm audio interface.

When detecting access from an external BLUETOOTH device, the third device automatically switches a BLUETOOTH mode of the third device to "search for a nearby device," and the first device starts and automatically sets a BLUETOOTH mode of the first device to "discoverable by a nearby device." The third device discovers the first device, and allocates a frequency hopping timeslot for the first device such that the frequency hopping timeslot of the first device is the same as a frequency hopping timeslot of the third device. Because the third device establishes the BLUETOOTH connection to the second device, the frequency hopping timeslot of the third device is the same as a frequency hopping timeslot of the second device, that is, the frequency hopping timeslot of the first device is the same as the frequency hopping timeslot of the second device.

The third device further sends a BLUETOOTH address of the second device to the first device using the interface on the third device. The first device adds the BLUETOOTH address of the second device to a listening table, and listens to, in the frequency hopping timeslot of the second device, the BLUETOOTH signal sent by a device in the listening table. When receiving the BLUETOOTH signal of the second device, the first device calculates, according to a wavelength of the BLUETOOTH signal, a baseline length between two neighboring antennas on the first device, a wave path difference and a phase difference of the BLUETOOTH signal received by the two antennas, a receiving angle of receiving a radio signal by the first device, and then calculates, according to the receiving angle, current position information of the second device relative to the first device.

The first device sends the position information of the second device to the third device using the interface on the first device, and uses a screen of the third device to display the position information of the second device.

Figure 9:
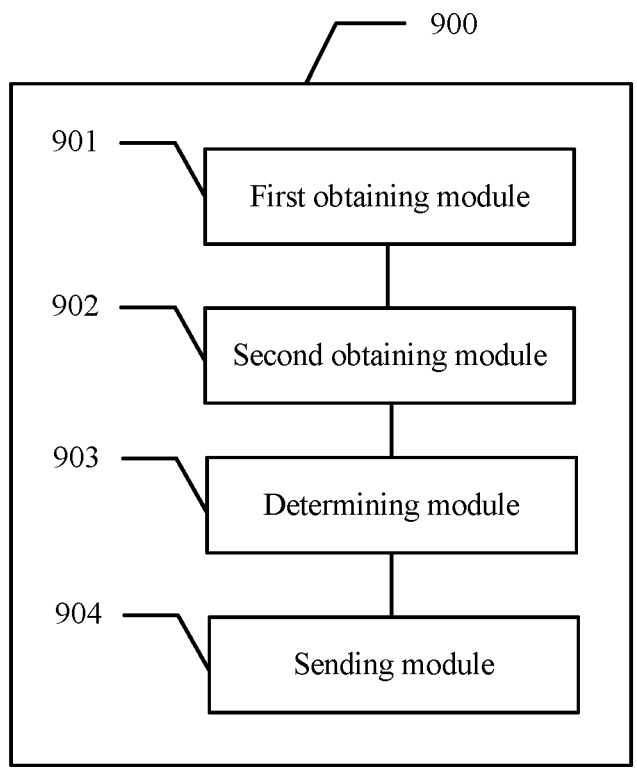
FIG. 9 is a schematic structural diagram of an embodiment of a first device according to the present disclosure.

The foregoing describes a device position obtaining method in the embodiments of the present disclosure. The following describes a first device in the embodiments of the present disclosure. Referring to FIG. 9, FIG. 9 is a schematic structural diagram of an embodiment of a first device 900 according to the present disclosure. In this embodiment, the first device 900 includes a first obtaining module 901 configured to obtain BLUETOOTH connection information of a second device, a second obtaining module 902 configured to obtain, according to the BLUETOOTH connection information, a BLUETOOTH signal sent by the second device, a determining module 903 configured to determine position information of the second device according to the obtained BLUETOOTH signal sent by the second device, and a sending module 904 configured to send the position information to a third device.

In this embodiment, because the first device 900 can measure an angle of a received radio signal, but an existing third device uses a single antenna structure, and position of a second device cannot be tracked, BLUETOOTH connection information of the second device can be obtained using the first device 900. In this way, the first device 900 can obtain, according to the BLUETOOTH connection information of the second device, a BLUETOOTH signal sent by the second device, and can further calculate position information of the second device according to the BLUETOOTH signal, and send the position information of the second device to the third device such that the third device can report the position information of the second device to a user, thereby providing the user with a method for searching for a second device intuitively and quickly.

In the embodiment shown in FIG. 9, there are multiple methods for the first obtaining module 901 to obtain the BLUETOOTH connection information of the second device. For example, the first obtaining module 901 is further configured to enable the first device 900 to perform device discovery with the third device, and obtain the BLUETOOTH connection information of the second device from the third device, where BLUETOOTH connection information of the second device is stored in the third device.

In the embodiment shown in FIG. 9, there are multiple methods for the second obtaining module 902 to obtain, according to the BLUETOOTH connection information, the BLUETOOTH signal sent by the second device. For example, the BLUETOOTH connection information of the second device includes a BLUETOOTH address of the second device. The second obtaining module 902 is further configured to add the BLUETOOTH address of the second device to a listening table, and listen to, on a full BLUETOOTH band, the BLUETOOTH signal sent by a device in the listening table.

For another example, the BLUETOOTH connection information of the second device includes a frequency hopping timeslot of the second device and a BLUETOOTH address of the second device. The second obtaining module 902 is further configured to add the BLUETOOTH address of the second device to a listening table, and listen to, in the frequency hopping timeslot of the second device, the BLUETOOTH signal sent by a device in the listening table.

For another example, the BLUETOOTH connection information of the second device includes a BLUETOOTH address of the second device. The second obtaining module 902 is further configured to receive the BLUETOOTH address that is of the second device and sent by the third device such that the first device 900 sets a whitelist that includes the BLUETOOTH address of the second device, enters a scanning mode, and establishes a BLUETOOTH connection to the second device when receiving a paging message that carries the BLUETOOTH address of the second device, and receive the BLUETOOTH signal sent by the second device.

For another example, the BLUETOOTH connection information of the second device includes a BLUETOOTH address of the second device. The second obtaining module 902 is further configured to switch the first device 900 to a connectable directed broadcast mode such that the first device 900 sends a connectable directed broadcast message, where the connectable directed broadcast message carries the BLUETOOTH address of the second device, and establishes a BLUETOOTH connection to the second device, and receive the BLUETOOTH signal sent by the second device.

For another example, the BLUETOOTH connection information of the second device includes a frequency hopping timeslot of the second device. The second obtaining module 902 is further configured to send a paging message in the frequency hopping timeslot of the second device, receive a paging response message of the paging message, where a time interval between the paging response message and the paging message is less than a preset time, establish a BLUETOOTH connection to the second device, and receive the BLUETOOTH signal sent by the second device.

There are multiple methods for the first obtaining module 901 to obtain the frequency hopping timeslot of the second device. For example, the first obtaining module 901 is further configured to receive a BLUETOOTH connection initiated by the third device such that the first device 900 and the third device have a same frequency hopping timeslot, where the third device and the second device have a same frequency hopping timeslot. The first obtaining module 901 is further configured to receive a role switching request initiated by the third device such that the first device 900 can send a paging message in the frequency hopping timeslot of the second device.

Figure 10:
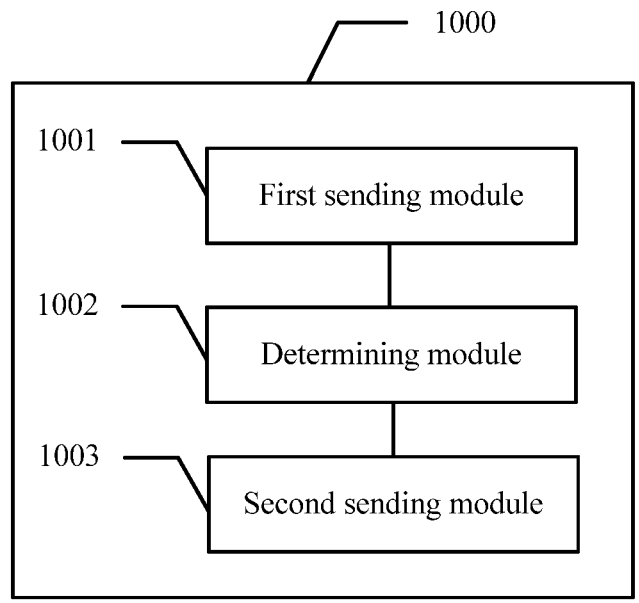
FIG. 10 is a schematic structural diagram of another embodiment of a first device according to the present disclosure.

Referring to FIG. 10, FIG. 10 is a schematic structural diagram of another embodiment of a first device 1000 according to the present disclosure. In this embodiment, the first device 1000 includes a first sending module 1001 configured to use a third device to send BLUETOOTH connection information of the first device 1000 to the second device such that the second device sends a BLUETOOTH signal to the first device 1000 according to the BLUETOOTH connection information of the first device 1000, a determining module 1002 configured to determine position information of the second device according to the obtained BLUETOOTH signal sent by the second device, and a second sending module 1003 configured to send the position information to the third device.

In this embodiment, a second device may send a BLUETOOTH signal to a first device 1000 according to BLUETOOTH connection information of an antenna array device. In this way, the first device 1000 can calculate position information of the second device according to the BLUETOOTH signal sent by the second device, and send the position information of the second device to a third device such that the third device can report the position information of the second device to a user, thereby providing the user with a method for searching for a second device intuitively and quickly.

In the embodiment shown in FIG. 10, there are multiple methods for the first sending module 1001 to send the BLUETOOTH connection information of the first device 1000 to the second device such that the second device sends the BLUETOOTH signal to the first device 1000 according to the BLUETOOTH connection information of the first device 1000.

For example, the first sending module 1001 is further configured to use the third device to send a BLUETOOTH address of the first device 1000 to the second device such that the second device sets a whitelist that includes the BLUETOOTH address of the first device 1000. The first sending module 1001 is further configured to enter a paging mode, and send a paging message to the outside, where the paging message carries the BLUETOOTH address of the first device 1000, establish a BLUETOOTH connection to the second device according to the whitelist of the second device, and receive the BLUETOOTH signal sent by the second device.

For another example, the BLUETOOTH connection information of the first device 1000 includes a BLUETOOTH address of the first device 1000. The first sending module 1001 is further configured to use the third device to send the BLUETOOTH address of the first device 1000 to the second device such that after receiving the BLUETOOTH address of the first device 1000, the second device switches to a connectable directed broadcast mode, and sends a connectable directed broadcast message that carries the BLUETOOTH address of the first device 1000. The first sending module 1001 is further configured to receive the connectable directed broadcast message, establish a BLUETOOTH connection to the second device, and receive the BLUETOOTH signal sent by the second device.

For an explanation and a description of each module on the first device 1000, refer to the explanations and the descriptions in the steps in the embodiments shown in FIG. 1 to FIG. 5. Details are not described herein again.

The foregoing embodiments describe in detail a first device of the present disclosure. The following describes in detail a third device of the present disclosure.

Figure 11:
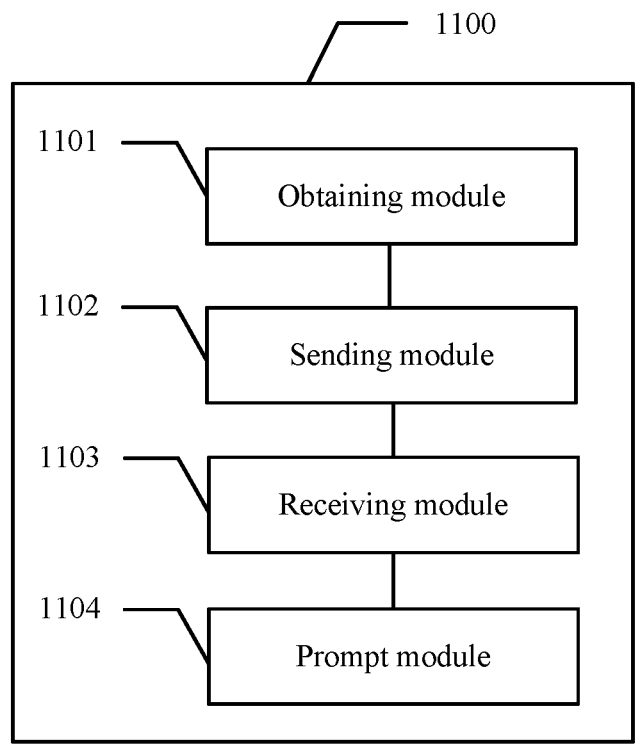
FIG. 11 is a schematic structural diagram of an embodiment of a third device according to the present disclosure.

Referring to FIG. 11, a third device 1100 in an embodiment of the present disclosure includes an obtaining module 1101 configured to obtain BLUETOOTH connection information of a second device, a sending module 1102 configured to send the BLUETOOTH connection information of the second device to a first device, a receiving module 1103 configured to receive position information of the second device that is sent by the first device, where the position information of the second device is determined by the first device according to a BLUETOOTH signal that is sent by the second device and that is obtained by the first device according to the BLUETOOTH connection information of the second device, and a prompt module 1104 configured to report the position information of the second device.

In this embodiment, because a first device can measure an angle of a received radio signal, but an existing third device 1100 uses a single antenna structure, and position of a second device cannot be tracked, BLUETOOTH connection information of the second device can be obtained using the first device. In this way, the first device can obtain, according to the BLUETOOTH connection information of the second device, a BLUETOOTH signal sent by the second device, and can further calculate position information of the second device according to the BLUETOOTH signal, and send the position information of the second device to the third device 1100 such that the third device 1100 can report the position information of the second device to a user, thereby providing the user with a method for searching for a second device intuitively and quickly.

In the embodiment shown in FIG. 11, there are multiple methods for the obtaining module 1101 to obtain the BLU- ETOOTH connection information of the second device. For example, the obtaining module 1101 is further configured to perform device discovery with the second device, or establish a BLUETOOTH connection to the second device, and receive the BLUETOOTH connection information of the second device that is sent by the second device.

In the embodiment shown in FIG. 11, there are multiple methods for the sending module 1102 to send the BLUETOOTH connection information of the second device to the first device. For example, the BLUETOOTH connection information of the second device includes a frequency hopping timeslot of the second device. The sending module 1102 is further configured to establish a BLUETOOTH connection to the first device such that the first device and the third device 1100 have a same frequency hopping timeslot. The sending module 1102 is further configured to initiate a role switching request to the first device such that the first device sends a paging message in the frequency hopping timeslot of the third device 1100. The sending module 1102 is further configured to send a trigger message to the second device, where the trigger message is used to instruct the second device to switch to a full scanning mode such that the second device receives the paging message.

In the embodiment shown in FIG. 11, alternatively, the obtaining module 1101 may not be configured to obtain the BLUETOOTH connection information of the second device, but to be configured to obtain BLUETOOTH connection information of the first device. In addition, the sending module 1102 is not configured to send the BLUETOOTH connection information of the second device to the first device, but is configured to send the BLUETOOTH connection information of the first device to the second device such that the second device sends the BLUETOOTH signal to the first device according to the BLUETOOTH connection information of the first device.

There are multiple methods for the obtaining module 1101 to obtain the BLUETOOTH connection information of the first device. For example, the obtaining module 1101 is further configured to perform device discovery with the first device, or establish a BLUETOOTH connection to the first device, and receive the BLUETOOTH connection information of the first device that is sent by the first device.

Optionally, the receiving module 1103 is further configured to receive the BLUETOOTH signal sent by the first device and a baseline length between two neighboring antennas on the antenna array device, and the third device 1100 further includes a calculation module (not shown), where the calculation module is configured to calculate the position information of the second device according to the BLUETOOTH signal and the baseline length between the two neighboring antennas on the antenna array device.

The foregoing embodiments describe in detail a third device of the present disclosure. The following describes in detail a second device of the present disclosure.

Figure 12:
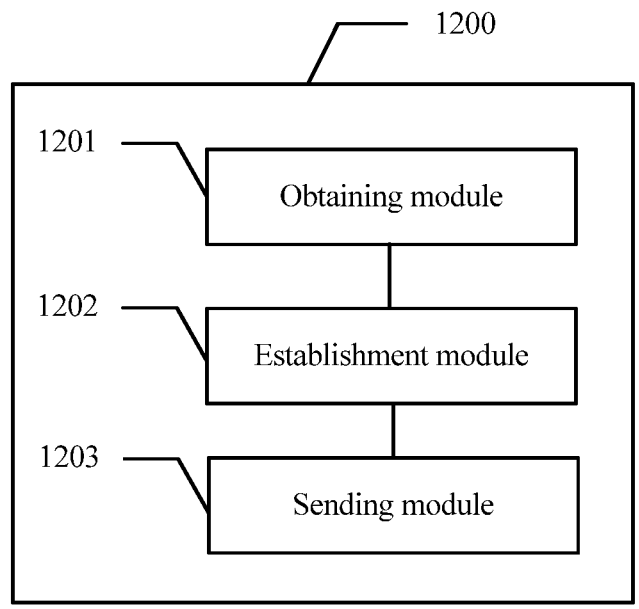
FIG. 12 is a schematic structural diagram of an embodiment of a second device according to the present disclosure.

Referring to FIG. 12, FIG. 12 is a schematic structural diagram of an embodiment of a second device 1200 according to the present disclosure. In this embodiment, the second device 1200 includes an obtaining module 1201 configured to obtain BLUETOOTH connection information of a first device, an establishment module 1202 configured to establish a BLUETOOTH connection to the first device according to the BLUETOOTH connection information of the first device, and a sending module 1203 configured to send a BLUETOOTH signal to the first device.

In this embodiment, because a multi-antenna array can measure an angle of a received radio signal, the second device 1200 can use a first device to send a BLUETOOTH signal such that the first device can calculate position information of the second device 1200 according to the BLUETOOTH signal, and a user can quickly find the second device 1200 according to the position information.

In the embodiment shown in FIG. 12, there are multiple methods for the establishment module 1202 to establish the BLUETOOTH connection to the first device. For example, the BLUETOOTH connection information of the first device includes a BLUETOOTH address of the first device. The establishment module 1202 is further configured to set a whitelist that includes the BLUETOOTH address of the first device such that the second device 1200 enters a scanning mode, and establishes the BLUETOOTH connection to the first device when the first device receives a paging message that carries the BLUETOOTH address of the first device.

For another example, the BLUETOOTH connection information of the first device includes a BLUETOOTH address of the first device. The establishment module 1202 is further configured to switch the second device 1200 to a connectable directed broadcast mode such that the second device 1200 sends a connectable directed broadcast message, where the connectable directed broadcast message carries the BLUETOOTH address of the first device such that the first device establishes a BLUETOOTH connection to the second device 1200 after receiving the connectable directed broadcast message.

Figure 13:
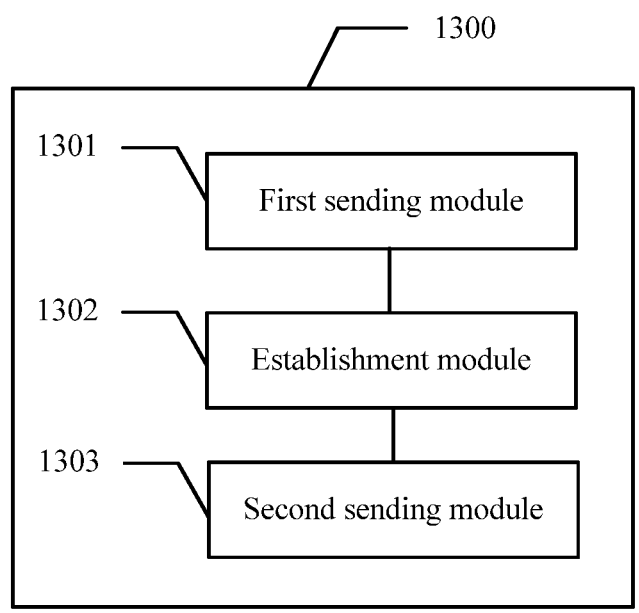
FIG. 13 is a schematic structural diagram of another embodiment of a second device according to the present disclosure.

Referring to FIG. 13, FIG. 13 is a schematic structural diagram of an embodiment of a second device 1300 according to the present disclosure. In this embodiment, the second device 1300 includes a first sending module 1301 configured to use the third device to send BLUETOOTH connection information of the second device 1300 to a first device, an establishment module 1302 configured to establish a BLUETOOTH connection to the first device, and a second sending module 1303 configured to send a BLUETOOTH signal to the first device.

In this embodiment, the second 1300 device 1300 uses the third device to send BLUETOOTH connection information of the second device 1300 to a first device such that the first device can establish a BLUETOOTH connection to the second device 1300 according to the BLUETOOTH connection information, and the first device can receive a BLUETOOTH signal sent by the second device 1300, and calculate position information of the second device 1300 according to the BLUETOOTH signal, thereby enabling a user to conveniently and quickly find the second device 1300.

In the embodiment shown in FIG. 13, there are multiple methods for the second device 1300 to establish the BLUETOOTH connection to the first device. For example, the first sending module 1301 is further configured to use the third device to send the BLUETOOTH address of the second device 1300 to the first device such that the first device sets a whitelist that includes the BLUETOOTH address of the second device 1300. The establishment module 1302 is further configured to enter a paging mode, and send a paging message to the outside, where the paging message carries the BLUETOOTH address of the second device 1300. The establishment module 1302 is further configured to establish a BLUETOOTH connection to the first device according to the whitelist of the first device.

For another example, the BLUETOOTH connection information of the second device 1300 includes a BLUETOOTH address of the second device 1300. The establishment module 1302 is further configured to receive a connectable directed broadcast message, determine that the connectable directed broadcast message is from the first device when the connectable directed broadcast message carries the BLUETOOTH address of the second device 1300, and establish a BLUETOOTH connection to the first device.

For another example, the BLUETOOTH connection information of the second device 1300 includes a frequency hopping timeslot of the second device 1300. The establishment module 1302 is further configured to switch the second device 1300 to a full scanning mode when receiving a trigger message sent by the third device such that the second device 1300 sends a paging response message when receiving a paging message in the frequency hopping timeslot of the second device 1300, and establish a BLUETOOTH connection to the first device.

The foregoing describes a first device, a third device, and a second device in the embodiments of the present disclosure from a perspective of a cellular functional entity. The following describes the first device and the third device in the embodiments of the present disclosure from a perspective of hardware processing.

Figure 14:
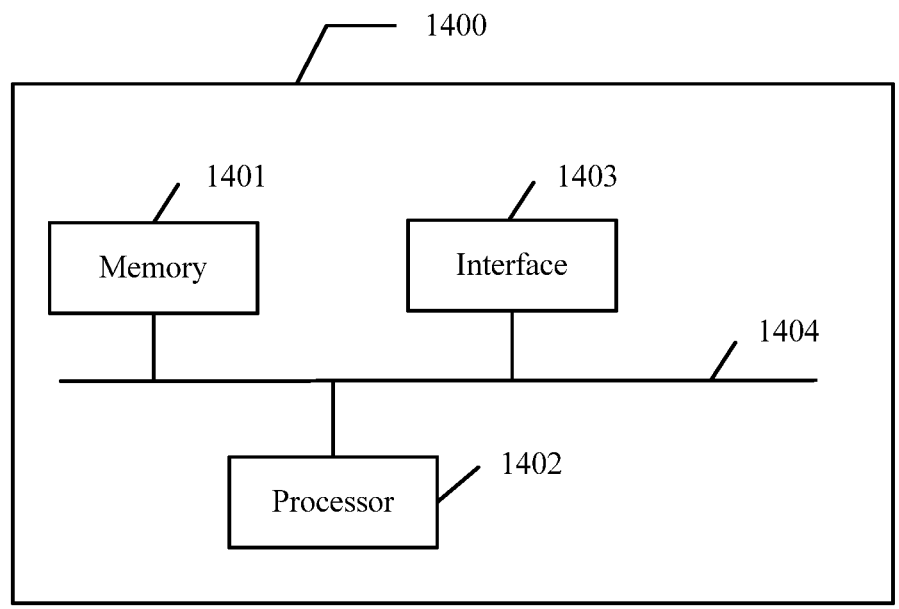
FIG. 14 is a schematic structural diagram of another embodiment of a first device according to the present disclosure.

Referring to FIG. 14, FIG. 14 is a schematic structural diagram of an embodiment of a first device 1400 according to the present disclosure. In this embodiment, the first device 1400 includes a memory 1401, one or more processors 1402, and one or more programs (not shown). The one or more programs are stored in the memory 1401, and are configured to be executed by the one or more processors 1402. In some embodiments of the present disclosure, the memory 1401 and the one or more processors 1402 can be connected to each other using a bus or in another manner. For example, in FIG. 14, the memory 1401 and the one or more processors 1402 are connected to each other using a bus 1404.

The one or more programs include an instruction, and the instruction is used to obtain BLUETOOTH connection information of a second device, obtain, according to the BLUETOOTH connection information, a BLUETOOTH signal sent by the second device, determine, position information of the second device according to the obtained BLUETOOTH signal sent by the second device, and send the position information to the third device.

Optionally, in this embodiment, the first device 1400 further includes an interface 1403, where the interface 1403 is used to connect to an interface of the third device such that the first device 1400 performs data interaction with the third device. Further, the interface 1403 may be a Micro USB interface or a 3.5 mm audio interface. This is not limited herein. The instruction is used to instruct the interface 1403 to send the position information of the second device to the third device.

Optionally, obtaining BLUETOOTH connection information of a second device includes performing device discovery with the third device, and obtaining the BLUETOOTH connection information of the second device from the third device, where the BLUETOOTH connection information of the second device is stored in the third device.

Optionally, the BLUETOOTH connection information of the second device includes a BLUETOOTH address of the second device, and obtaining, according to the BLUETOOTH connection information, a BLUETOOTH signal sent by the second device includes adding the BLUETOOTH address of the second device to a listening table, and listening to, on a full BLUETOOTH band, the BLUETOOTH signal sent by a device in the listening table.

Optionally, the BLUETOOTH connection information of the second device includes a frequency hopping timeslot of the second device and a BLUETOOTH address of the second device. Obtaining, according to the BLUETOOTH connection information, a BLUETOOTH signal sent by the second device includes adding the BLUETOOTH address of the second device to a listening table, and listening to, in a frequency hopping timeslot of the second device, the BLUETOOTH signal sent by a device in the listening table.

Optionally, the BLUETOOTH connection information of the second device includes a BLUETOOTH address of the second device. Obtaining, according to the BLUETOOTH connection information, a BLUETOOTH signal sent by the second device includes setting a whitelist that includes the BLUETOOTH address of the second device, entering a scanning mode, and establishing a BLUETOOTH connection to the second device when receiving a paging message that carries the BLUETOOTH address of the second device, and receiving the BLUETOOTH signal sent by the second device.

Optionally, the BLUETOOTH connection information of the second device includes a BLUETOOTH address of the second device. Obtaining, according to the BLUETOOTH connection information, a BLUETOOTH signal sent by the second device includes switching to a connectable directed broadcast mode, sending a connectable directed broadcast message, where the connectable directed broadcast message carries the BLUETOOTH address of the second device, establishing a BLUETOOTH connection to the second device, and receiving the BLUETOOTH signal sent by the second device.

Optionally, the BLUETOOTH connection information of the second device includes a frequency hopping timeslot of the second device. Obtaining, according to the BLUETOOTH connection information, a BLUETOOTH signal sent by the second device includes instructing the BLUETOOTH module to send a paging message in the frequency hopping timeslot of the second device, receiving a paging response message of the paging message, where a time interval between the paging response message and the paging message is less than a preset time, establishing a BLUETOOTH connection to the second device, and receiving the BLUETOOTH signal sent by the second device.

Figure 15:
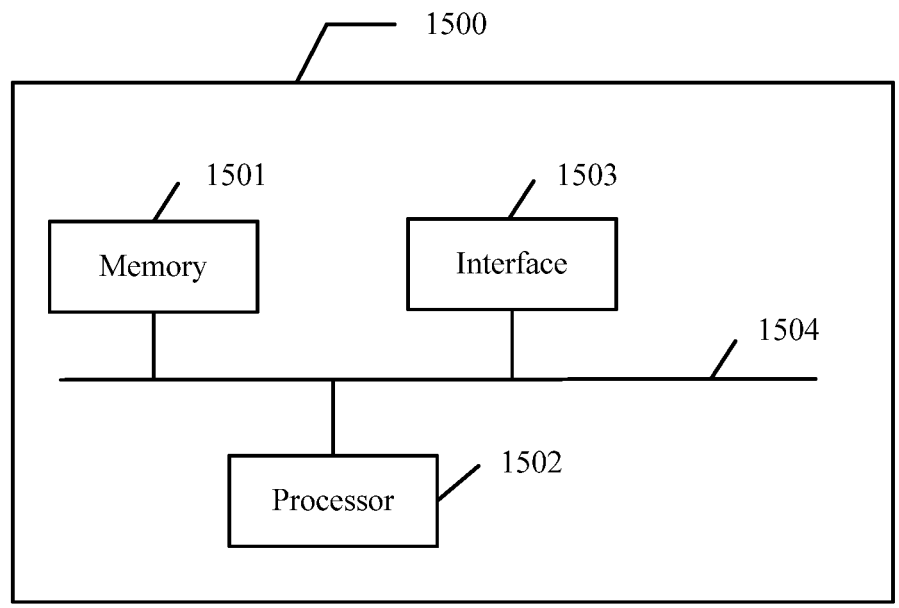
FIG. 15 is a schematic structural diagram of an embodiment of a third device according to the present disclosure.

Referring to FIG. 15, FIG. 15 is a schematic structural diagram of an embodiment of a third device 1500 according to the present disclosure. In this embodiment, the third device 1500 includes a memory 1501, one or more processors 1502, and one or more programs (not shown). The one or more programs are stored in the memory 1501, and are configured to be executed by the one or more processors 1502. The one or more programs include an instruction. In some embodiments of the present disclosure, the memory 1501 and the one or more processors 1502 can be connected to each other using a bus or in another manner. For example, in FIG. 15, the memory 1501 and the one or more processors 1502 are connected to each other using a bus 1504.

The instruction is used to obtain BLUETOOTH connection information of a second device, send the BLUETOOTH connection information of the second device to a first device, receive position information of the second device that is sent by the first device, where the position information of the second device is determined by the first device according to a BLUETOOTH signal that is sent by the second device and that is obtained by the first device according to the BLUETOOTH connection information of the second device, and report the position information of the second device.

Optionally, in this embodiment, the third device 1500 further includes an interface 1503. The third device 1500 can perform data interaction with the first device using the interface 1503. Further, the interface 1503 may be a Micro USB interface or a 3.5 mm audio interface. This is not limited herein. The instruction is used to instruct the interface 1503 to receive the position information of the second device that is sent by the first device.

Optionally, obtaining BLUETOOTH connection information of a second device includes performing device discovery with the second device, or establishing a BLUETOOTH connection to the second device, and receiving the BLUETOOTH connection information of the second device that is sent by the second device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. A first device, comprising:
a processor; and
a memory coupled to the processor and configured to store program instructions that, when executed by the processor, cause the first device to:
obtain a BLUETOOTH address of a second device;
store the BLUETOOTH address in a listening table;
obtain, according to the BLUETOOTH address and from the second device, a BLUETOOTH signal on a BLUETOOTH band;
obtain position information associated with the second device according to the BLUETOOTH signal; and
send the position information to a third device.

2. The first device of claim 1, wherein the first device is configured to operate in a mode discoverable by a nearby BLUETOOTH device.

3. The first device of claim 1, wherein the processor is further configured to:
set a whitelist comprising the BLUETOOTH address;
enter a scanning mode;
establish a BLUETOOTH connection to the second device when receiving a paging message comprising the BLUETOOTH address; and
receive the BLUETOOTH signal from the second device.

4. The first device of claim 1, wherein obtaining the BLUETOOTH signal from the second device comprises:
switching the first device to a connectable directed broadcast mode;
sending a connectable directed broadcast message, wherein the connectable directed broadcast message comprises the BLUETOOTH address;
establishing a BLUETOOTH connection to the second device; and
receiving the BLUETOOTH signal from the second device.

5. The first device of claim 1, wherein obtaining the BLUETOOTH signal from the second device comprises:
performing device discovery of the second device; and
receiving the BLUETOOTH signal from the second device.

6. The first device of claim 1, wherein obtaining the BLUETOOTH signal from the second device comprises:
establishing a BLUETOOTH connection to the second device; and
receiving the BLUETOOTH signal from the second device.

7. The first device of claim 1, wherein the third electronic device is further configured to track the second device according to the position information of the second device.

8. A system, comprising:
a first electronic device configured to:
receive a paging message from a second electronic device, wherein the paging message comprises an identifier of the first electronic device;
send, in response to the paging message, a paging response message to the second electronic device;
establish a BLUETOOTH connection with the second electronic device; and
determine position information associated with the second electronic device according to a BLUETOOTH signal from the second electronic device, wherein the second electronic device is configured to send the paging message to the first electronic device; and a third electronic device configured to:
  receive the position information; and
  display, according to the position information, a position of the second electronic device on a user interface of the third electronic device, wherein the third electronic device is further configured to track the second device according to the position information of the second device.

9. The system of claim 8, wherein the first electronic device comprises a first coupling, wherein the third electronic device comprises a second coupling, and wherein the third electronic device is configured to obtain the position information when the first coupling connects with the second coupling.

10. The system of claim 8, wherein the first electronic device comprises a multi-antenna, and wherein the first electronic device is configured to measure an angle of the BLUETOOTH signal using the multi-antenna.

11. The system of claim 8, wherein the first electronic device comprises a white list of identifiers, and wherein the white list further comprises the identifier of the second electronic device.

12. The system of claim 8, wherein the third electronic device is further configured to:
  enter a scanning mode; and
  establish a BLUETOOTH connection with the second device when receiving a paging message that carries an identifier of the second device.

13. The system of claim 8, wherein the third electronic device is further configured to report the position of the second electronic device by voice.

14. The system of claim 8, wherein the first electronic device further comprises a listening table for storing BLUETOOTH information.

15. A first electronic device, comprising:
  a multi-antenna operably coupled to;
  a processor; and
  a memory comprising a white list of identifiers comprising the identifier of a second electronic device, wherein the memory is coupled to the processor and configured to store program instructions that, when executed by the processor, cause the first electronic device to:
    receive a paging message from a second electronic device, wherein the paging message comprises an identifier of the first electronic device;
    send, in response to the paging message, a paging response message to the second electronic device;
    establish a BLUETOOTH connection with the second electronic device;
    measure the angle of the BLUETOOTH signal using the multi-antenna; and
    determine position information associated with the second electronic device according to a BLUETOOTH signal from the second electronic device.

16. The first electronic device of claim 15, further comprising performing device discovery of the second device.

17. The first electronic device of claim 15, wherein the instructions further cause the first device to operate in a mode discoverable by a nearby BLUETOOTH device.

18. The first electronic device of claim 15, wherein the instructions further cause the first electronic device to:
  switch the first device to a connectable directed broadcast mode;
  send a connectable directed broadcast message, wherein the connectable directed broadcast message comprises a BLUETOOTH address of the second device; and
  receive the BLUETOOTH signal from the second device.

19. The first electronic device of claim 15, wherein the memory further comprises a listening table.

20. The first electronic device of claim 15, further comprising instructions to cause the first electronic device to send the position information of the second electronic device to a third electronic device wherein the third electronic device is further configured to track the second electronic device according to the position information.

* * * * *